United States Patent
Jin et al.

(10) Patent No.: US 11,923,758 B2
(45) Date of Patent: Mar. 5, 2024

(54) POWER CONVERSION CIRCUIT WITH A TRANSFORMER

(71) Applicant: Delta Electronics, Inc., Taoyuan (TW)

(72) Inventors: Da Jin, Taoyuan (TW); Zhengyu Ye, Taoyuan (TW); Xueliang Chang, Taoyuan (TW); Shengli Lu, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 133 days.

(21) Appl. No.: 17/581,577

(22) Filed: Jan. 21, 2022

(65) Prior Publication Data
US 2022/0247303 A1 Aug. 4, 2022

(30) Foreign Application Priority Data

Feb. 4, 2021 (CN) .......................... 202110166590.5

(51) Int. Cl.
| | | |
|---|---|---|
| H02M 1/00 | (2006.01) | |
| H02M 1/088 | (2006.01) | |
| H02M 3/07 | (2006.01) | |
| H02M 3/158 | (2006.01) | |

(52) U.S. Cl.
CPC .......... *H02M 1/088* (2013.01); *H02M 1/0058* (2021.05); *H02M 3/158* (2013.01); *H02M 3/07* (2013.01)

(58) Field of Classification Search
CPC ............... H02M 3/158; H02M 3/1584; H02M 3/33569; H02M 1/0064; H02M 1/0095; H02M 3/07; H02M 3/01; H02M 1/008
See application file for complete search history.

(56) References Cited

U.S. PATENT DOCUMENTS

| | | | | |
|---|---|---|---|---|
| 6,392,902 B1 * | 5/2002 | Jang | ................. | H02M 3/33573 363/56.02 |
| 9,917,517 B1 * | 3/2018 | Jiang | ...................... | H02M 1/34 |
| 10,199,950 B1 * | 2/2019 | Vinciarelli | ........ | H02M 3/33576 |

(Continued)

FOREIGN PATENT DOCUMENTS

| | | | | |
|---|---|---|---|---|
| CN | 105024554 A | * | 11/2015 | ............. H02M 1/44 |
| DE | 102021210395 A1 | * | 6/2022 | .......... H02M 1/0067 |

OTHER PUBLICATIONS

D. Huang, X. Wu and F. C. Lee, "Novel non-isolated LLC resonant converters," 2012 Twenty-Seventh Annual IEEE Applied Power Electronics Conference and Exposition (APEC), 2012, pp. 1373-1380.

*Primary Examiner* — Sisay G Tiku
(74) *Attorney, Agent, or Firm* — KIRTON McCONKIE; Evan R. Witt

(57) ABSTRACT

A power conversion circuit includes an input positive terminal, an input negative terminal, an output positive terminal, an output negative terminal, a first bridge arm, a second bridge arm, a transformer, a first resonant capacitor, a second resonant capacitor, a third resonant capacitor and a third resonant capacitor. The transformer includes a first winding, a second winding and a third winding. The plurality of switches in the first bridge arm and the plurality of switches in the second bridge arm are selectively turned on or turned off. The ratio of the input voltage to the output voltage can be adjustable by changing the turn numbers of the first winding, the second winding and the third winding.

15 Claims, 16 Drawing Sheets

(56) References Cited

U.S. PATENT DOCUMENTS

| | | | | |
|---|---|---|---|---|
| 10,224,803 B1* | 3/2019 | Rainer | ............... | H02M 3/335 |
| 10,256,729 B1* | 4/2019 | Notsch | ............... | H02M 3/1588 |
| 10,594,223 B1* | 3/2020 | Vinciarelli | ........ | H02M 3/33576 |
| 10,804,798 B1* | 10/2020 | Rizzolatti | ......... | H02M 3/33573 |
| 11,075,583 B1* | 7/2021 | Vinciarelli | ........ | H02M 3/33561 |
| 11,637,491 B2* | 4/2023 | Petersen | ................ | H02M 3/07 |
| | | | | 323/271 |
| 2014/0346962 A1* | 11/2014 | Sanders | ............ | H05B 45/3725 |
| | | | | 315/193 |
| 2016/0261195 A1* | 9/2016 | Yamaoka | .......... | H02M 3/33592 |
| 2020/0204072 A1* | 6/2020 | Yang | ................... | H02M 3/158 |
| 2020/0389098 A1* | 12/2020 | Jin | ........................ | H01F 27/28 |
| 2021/0265909 A1* | 8/2021 | Ye | ...................... | H02M 3/33523 |
| 2021/0288576 A1* | 9/2021 | Rizzolatti | ............. | H02M 1/007 |
| 2021/0408924 A1* | 12/2021 | Jin | ........................ | H02M 3/01 |
| 2022/0006372 A1* | 1/2022 | Jin | ...................... | H02M 1/0064 |
| 2022/0006380 A1* | 1/2022 | Jin | ...................... | H02M 1/0048 |
| 2022/0014086 A1* | 1/2022 | Ye | ........................ | H02M 7/219 |
| 2022/0014109 A1* | 1/2022 | Ye | ...................... | H02M 1/0064 |
| 2022/0051842 A1* | 2/2022 | Chang | ............... | H02M 3/33573 |
| 2022/0052609 A1* | 2/2022 | Vinciarelli | ........ | H02M 3/33561 |
| 2022/0209661 A1* | 6/2022 | Jin | ...................... | H02M 3/1584 |
| 2022/0209671 A1* | 6/2022 | Ye | ...................... | H02M 1/0095 |
| 2022/0247303 A1* | 8/2022 | Jin | ...................... | H02M 1/088 |
| 2022/0255429 A1* | 8/2022 | Chen | ...................... | H02M 3/07 |
| 2023/0020726 A1* | 1/2023 | Jin | ......................... | H02M 3/07 |
| 2023/0238173 A1* | 7/2023 | Jin | ...................... | H02M 3/003 |
| | | | | 336/212 |

* cited by examiner

POWER CONVERSION CIRCUIT WITH A TRANSFORMER

CROSS-REFERENCE TO RELATED APPLICATION

This application claims priority to China Patent Application No. 202110166590.5, filed on Feb. 4, 2021. The entire contents of the above-mentioned patent application are incorporated herein by reference for all purposes.

FIELD OF THE INVENTION

The present disclosure relates to a power conversion circuit, and more particularly to a power conversion circuit for providing an adjustable ratio of an input voltage to an output voltage.

BACKGROUND OF THE INVENTION

With the rapid development of fixed network and mobile communications, the demands on high-power DC/DC power converters (especially the fixed-ratio converters) are increasing. FIG. 1 is a schematic circuit diagram illustrating a conventional power conversion circuit with an expandable duty-cycle. The ratio of the input voltage to the output voltage is 4:1. The power conversion circuit with the expandable duty-cycle has the advantage of high-power density.

As shown in FIG. 1, the power conversion circuit includes a plurality of switches S1A, S1B, S1C, S2A, S2B and S2C, two capacitors Cr and two windings T. The on/off states of the switches S1A, S2B and S1C and one/off states of the switches S2A, S1B and S2C are complementary to each other. In addition, the duty cycle of each switch is 50%. The voltage across each of the two capacitors Cr is equal to Vin/2. The waveforms of the voltages at the two terminals A and B of the two windings T are complementary square waves (0 to Vin/2). The voltages at the two terminals A and B cannot be changed by adjusting the capacitance of the capacitor Cr. That is, in the conventional power conversion circuit, the ratio of the input voltage to the output voltage is not adjustable. Since the ratio of the input voltage to the output voltage can only be 4:1, the applications of the conventional power conversion circuit are not satisfactory.

Therefore, there is a need of providing an improved power conversion circuit in order to overcome the drawbacks of the conventional technologies.

SUMMARY OF THE INVENTION

The present disclosure provides a power conversion circuit for providing an adjustable ratio of an input voltage to an output voltage.

In accordance with an aspect of the present disclosure, a power conversion circuit is provided. The power conversion circuit includes an input positive terminal, an input negative terminal, an output positive terminal, an output negative terminal, a first bridge arm, a second bridge arm, a transformer, a first resonant capacitor, a second resonant capacitor, a third resonant capacitor and an output capacitor. The input negative terminal and the output negative terminal are connected with each other. The first bridge arm includes a first switch, a second switch, a third switch and a fourth switch, which are connected in series between the input positive terminal and the input negative terminal. The first switch and the second switch are connected with a first node. The second switch and the third switch are connected with a second node. The third switch and the fourth switch are connected with a third node. The second bridge arm includes a fifth switch, a sixth switch, a seventh switch and an eighth switch, which are connected in series between the input positive terminal and the input negative terminal. The fifth switch and the sixth switch are connected with a fourth node. The sixth switch and the seventh switch are connected with a fifth node. The seventh switch and the eighth switch are connected with a sixth node. The transformer includes a first winding, a second winding and a third winding, which are coupled with each other. The second winding is electrically connected between the third node and the output positive terminal. The third winding is electrically connected with the sixth node and the output positive terminal. The first resonant capacitor and the first winding are connected in series between the second node and the fifth node. The second resonant capacitor is electrically connected between the first node and the third node. The third resonant capacitor is electrically connected between the fourth node and the sixth node. The output capacitor is electrically connected between the output positive terminal and the output negative terminal.

The above contents of the present disclosure will become more readily apparent to those ordinarily skilled in the art after reviewing the following detailed description and accompanying drawings, in which:

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
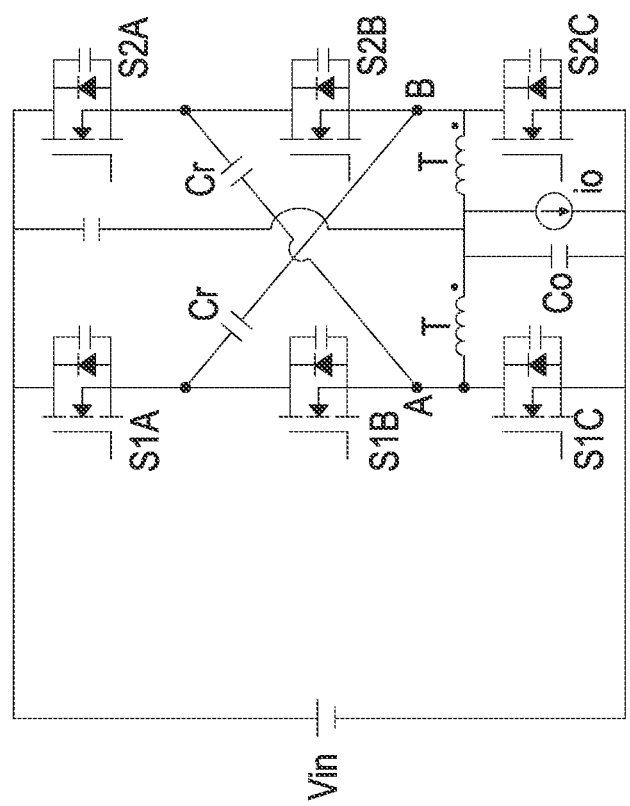
FIG. 1 is a schematic circuit diagram illustrating a conventional power conversion circuit with an expandable duty-cycle.
Figure 2A:
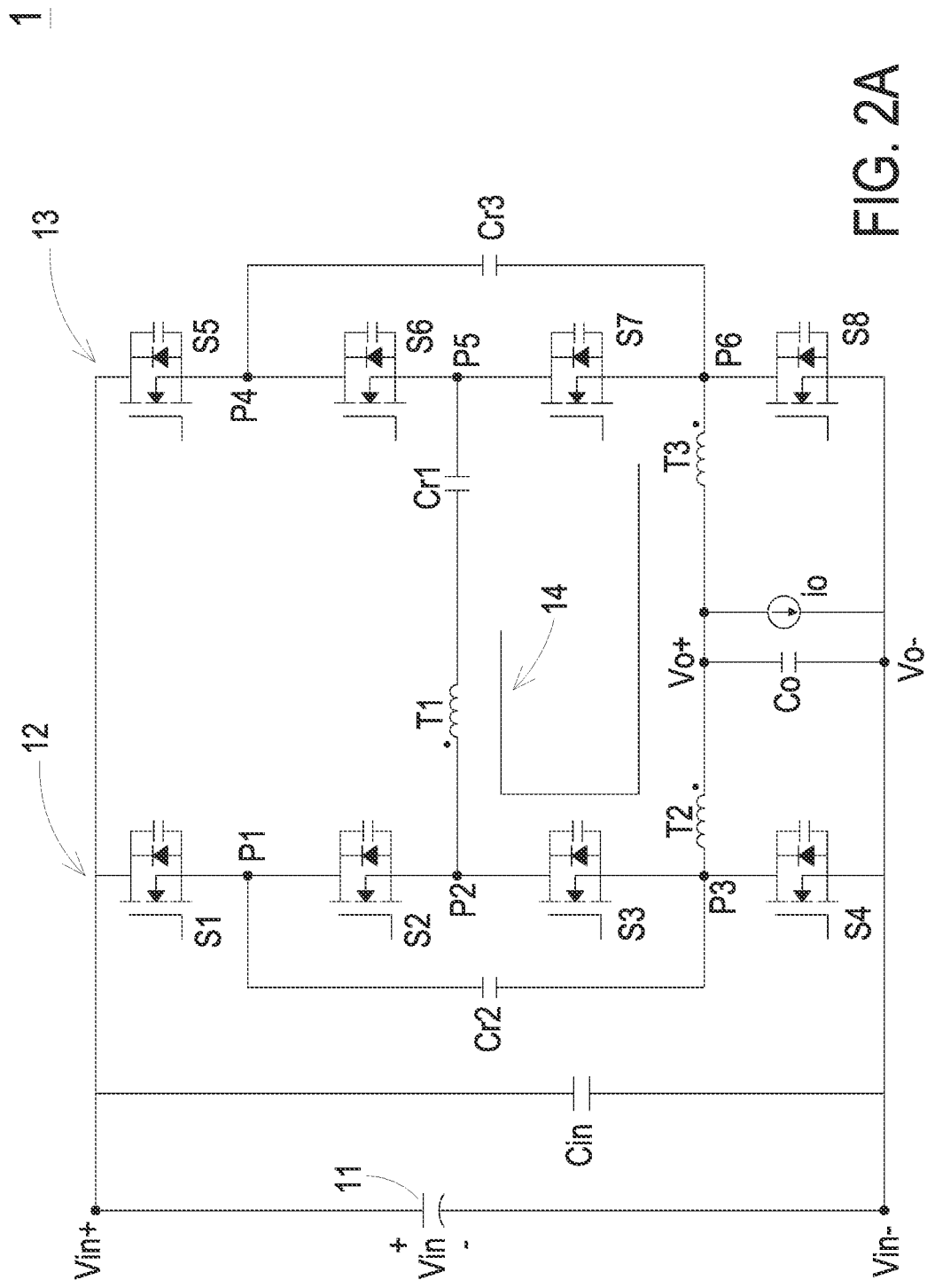
FIG. 2A is a schematic circuit diagram illustrating the circuitry structure of a power conversion circuit according to a first embodiment of the present disclosure.

FIG. 2A is a schematic circuit diagram illustrating the circuitry structure of a power conversion circuit according to a first embodiment of the present disclosure. The power conversion circuit 1 is electrically connected with a voltage source 11 and a load. The power conversion circuit 1 receives an input voltage Vin from the power source 11. The input voltage Vin is converted into an output voltage Vo and an output current io by the power conversion circuit 1. The output voltage Vo and the output current io are supplied to the load. The power conversion circuit 1 includes an input positive terminal Vin+, an input negative terminal Vin−, an output positive terminal Vo+, an output negative terminal Vo−, a first bridge arm 12, a second bridge arm 13, a transformer 14, a first resonant capacitor Cr1, a second resonant capacitor Cr2, a third resonant capacitor Cr3 and an output capacitor Co. The input positive terminal Vin+ and the input negative terminal Vin− are electrically connected with the voltage source 11. The power conversion circuit 1 receives the input voltage Vin through the input positive terminal Vin+ and the input negative terminal Vin−. The output positive terminal Vo+ and the output negative terminal Vo− are electrically connected with the load. The output voltage Vo and the output current io are outputted from the power conversion circuit 1 to the load through the output positive terminal Vo+ and the output negative terminal Vo−.

The first bridge arm 12 includes a first switch S1, a second switch S2, a third switch S3 and a third switch S4, which are sequentially connected in series between the input positive terminal Vin+ and the input negative terminal Vin−. The first terminal of the first switch S1 is electrically connected with the input positive terminal Vin+. The second terminal of the fourth switch S4 is electrically connected with the input negative terminal Vin−. The second terminal of the first switch S1 and the first terminal of the second switch S2 are connected with a first node P1. The second terminal of the second switch S2 and the first terminal of the third switch S3 are connected with a second node P2. The second terminal of the third switch S3 and the first terminal of the fourth switch S4 are connected with a third node P3. Preferably but not exclusively, the switches S1, S2, S3 and S4 of the first bridge arm 12 are MOSFET switches, SiC switches or GaN switches.

The second bridge arm 13 and the first bridge arm 12 are connected with each other in parallel. The second bridge arm 13 includes a fifth switch S5, a sixth switch S6, a seventh switch S7 and an eighth switch S8, which are sequentially connected in series between the input positive terminal Vin+ and the input negative terminal Vin−. The first terminal of the fifth switch S5 is electrically connected with the input positive terminal Vin+. The second terminal of the eighth switch S8 is electrically connected with the input negative terminal Vin−. The second terminal of the fifth switch S5 and the first terminal of the sixth switch S6 are connected with a fourth node P4. The second terminal of the sixth switch S6 and the first terminal of the seventh switch S7 are connected with a fifth node P5. The second terminal of the seventh switch S7 and the first terminal of the eighth switch S8 are connected with a sixth node P6. Preferably but not exclusively, the switches S5, S6, S7 and S8 of the second bridge arm 13 are MOSFET switches, SiC switches or GaN switches.

The transformer 14 includes a first winding T1, a second winding T2 and a third winding T3. The first winding T1, the second winding T2 and the third winding T3 are wound around the same magnetic core (not shown) and coupled with each other. The turn number of the first winding T1 is N1, the turn number of the second winding T2 is N2, and the turn number of the third winding is N2, wherein N1 and N2 are positive integers. The first winding T1 and the first resonant capacitor Cr1 are connected in series between the second node P2 and the fifth node P5. In this embodiment, the first terminal of the first winding T1 is electrically connected with the second node P2. The second terminal of the first winding T1 is electrically connected with the first terminal of the first resonant capacitor Cr1. Moreover, the second terminal of the first resonant capacitor Cr1 is electrically connected with the fifth node P5. The second winding T2 is electrically connected between the third node P3 and the output positive terminal Vo+. The third winding T3 is electrically connected between the output positive terminal Vo+ and the sixth node P6. In this embodiment, the first terminal of the second winding T2 and the first terminal of the third winding T3 are electrically connected with the output positive terminal Vo+. The second terminal of the second winding T2 is electrically connected with the third node P3. The second terminal of the third winding T3 is electrically connected with the sixth node P6. In this embodiment, the first terminal of the first winding T1, the first terminal of the second winding T2 and the second terminal of the third winding T3 are dotted terminals.

The second resonant capacitor Cr2 is electrically connected between the first node P1 and the third node P3. The third resonant capacitor Cr3 is electrically connected between the fourth node P4 and the sixth node P6. The output capacitor Co is electrically connected between the output positive terminal Vo+ and the output negative terminal Vo−. In this embodiment, the power conversion circuit 1 further includes an input capacitor Cin. The input capacitor Cin is electrically connected between the input positive terminal Vin+ and the input negative terminal Vin−.

Figure 2B:
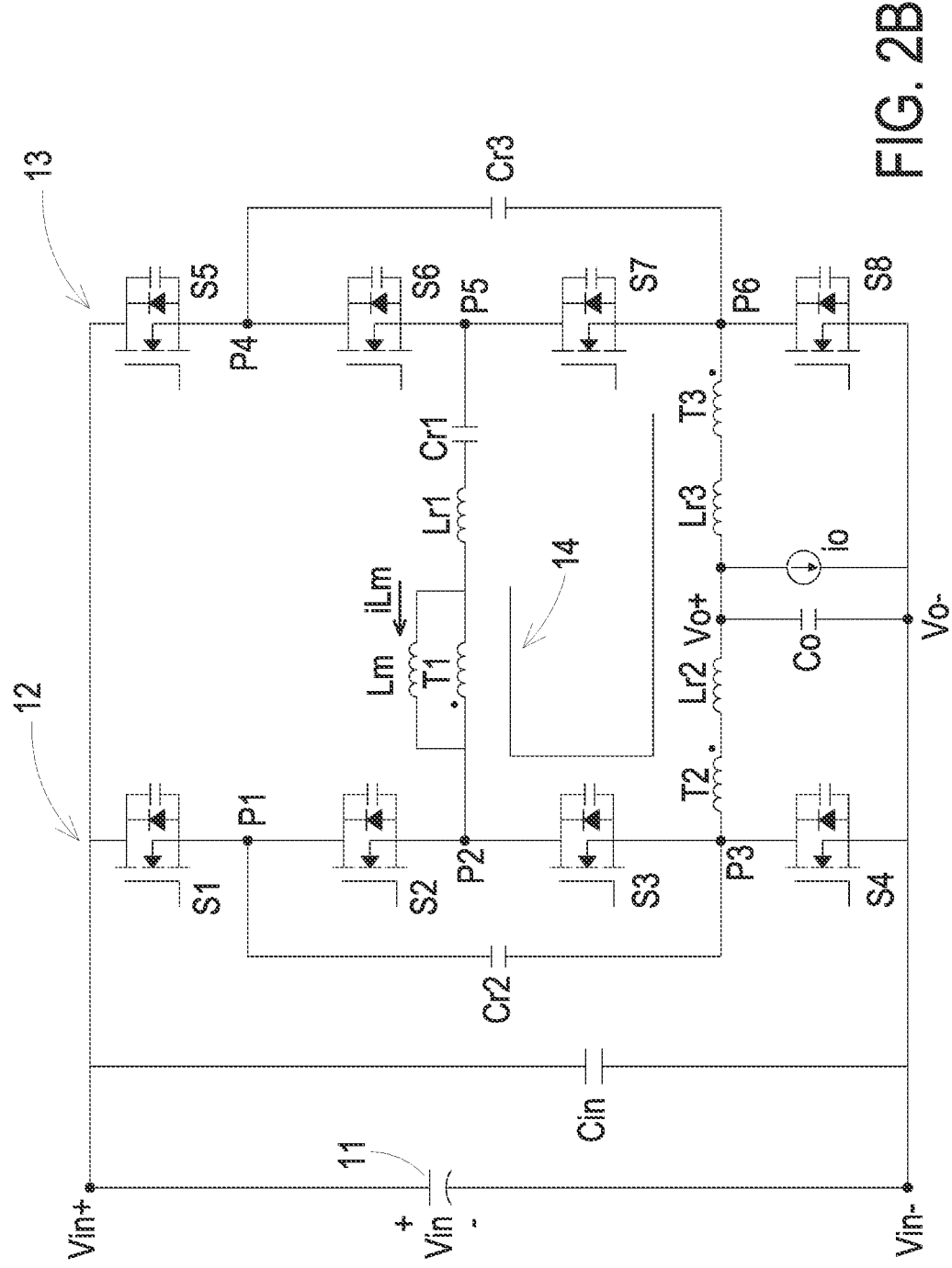
FIG. 2B is a schematic circuit diagram illustrating the circuitry structure of the power conversion circuit of FIG. 2A with an equivalent magnetized inductor and a plurality of inductors.

FIG. 2B is a schematic circuit diagram illustrating the circuitry structure of the power conversion circuit of FIG. 2A with an equivalent magnetized inductor and a plurality of inductors. As shown in FIG. 2B, the transformer 14 of the power conversion circuit 1 includes an equivalent magnetized inductor Lin. The equivalent magnetized inductor Lin is connected with the first winding T1 in parallel or connected with the second winding T2 or the third winding T3 in parallel. For illustration, in this embodiment, the equivalent magnetized inductor Lin is connected with the first winding T1 is parallel. The power conversion circuit 1 further includes a first inductor Lr1, a second inductor Lr2 and a third inductor Lr3. The first inductor Lr1, the first winding T1 and the first resonant capacitor Cr1 are connected in series between the second node P2 and the fifth node P5. The first inductor Lr1 is a leakage inductor of the transformer 14, or a first external inductor, or a combination of the leakage inductor of the transformer 14 and the first external inductor. The second inductor Lr2 and the second winding T2 are connected in series between the third node P3 and the output positive terminal Vo+. The second inductor Lr2 is a leakage inductor of the transformer 14, or a second external inductor, or a combination of the leakage inductor of the transformer 14 and the second external inductor. The third inductor Lr3 and the third winding T3 are connected in series between the sixth node P6 and the output positive terminal Vo+. The third inductor Lr3 is a leakage inductor of the transformer 14, or a third external inductor, or a combination of the leakage inductor of the transformer 14 and the third external inductor.

In this embodiment, the voltage across each of the second resonant capacitor Cr2 and the third resonant capacitor Cr3 is equal to the sum of the DC voltage component generated by the voltage source 11 and the oscillation AC voltage component generated by the transformer 14. The DC voltage component generated by the voltage source 11 is equal to the difference between the input voltage Vin and two times the output voltage Vo (i.e., Vin−2×Vo). Preferably, the capacitance of the input capacitor Cin is much greater than the capacitance of the resonant capacitors Cr1, Cr2 and Cr3, and the capacitance of the output capacitor Co is much greater than the capacitance of the resonant capacitors Cr1, Cr2 and Cr3. Consequently, in the following process of analyzing the circuit resonance, the influence of the input capacitor Cin and the output capacitor Co can be neglected.

Figure 3:
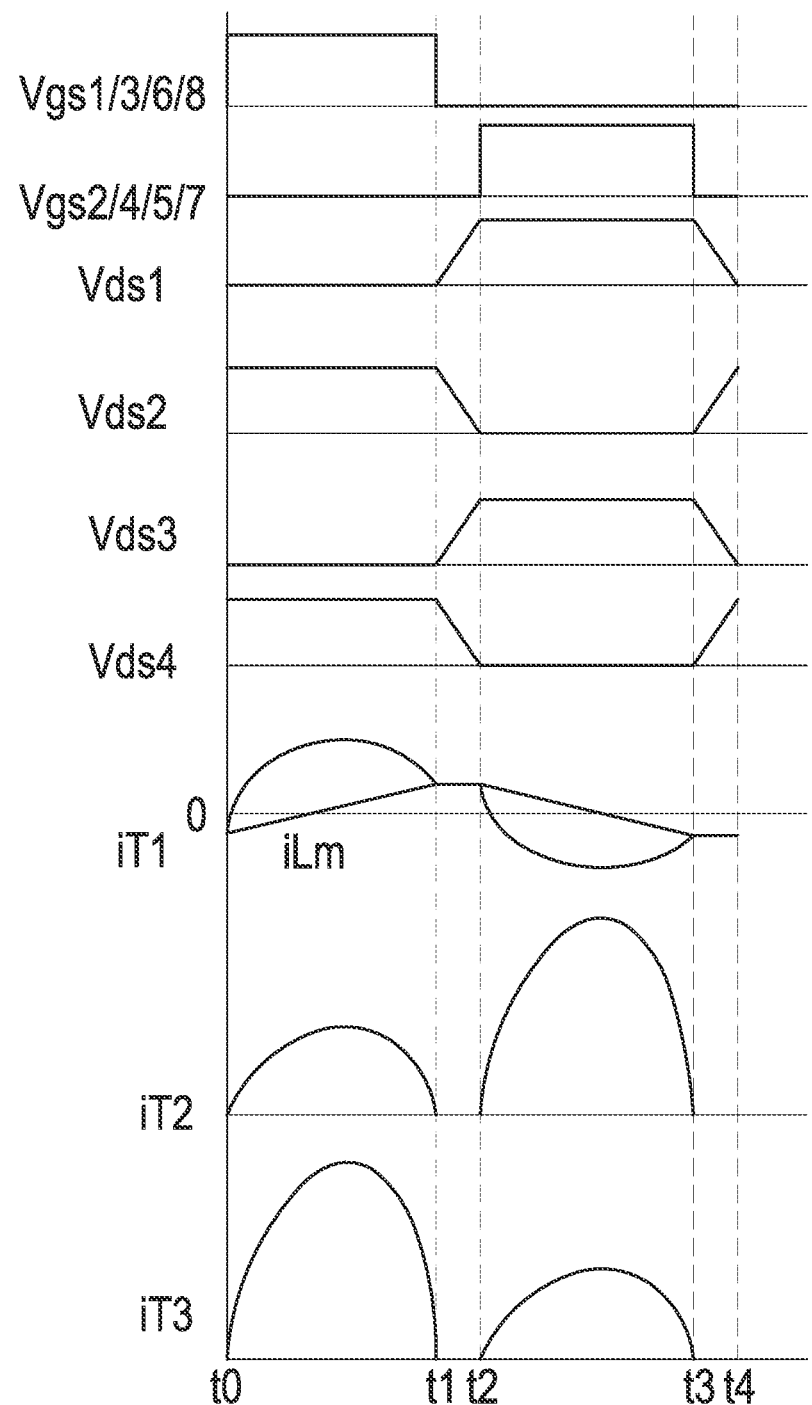
FIG. 3 is a schematic timing waveform diagram illustrating voltages and currents of associated components in the power conversion circuit as shown in FIG. 2B.
Figure 4A:
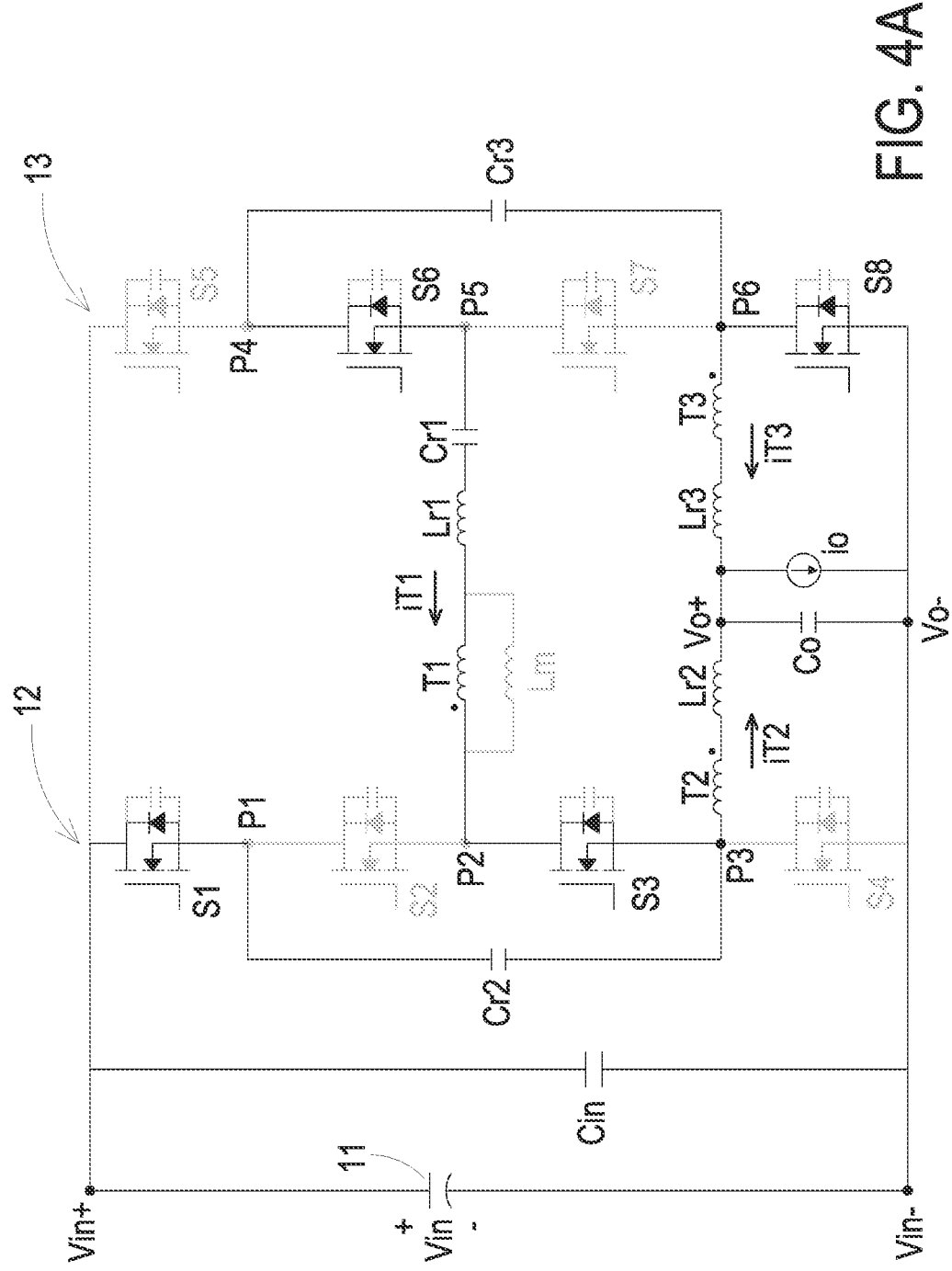
FIG. 4A is a schematic circuit diagram illustrating the current loop of the power conversion circuit as shown in FIG. 2B in the time interval between time t0 and time t1.
Figure 4B:
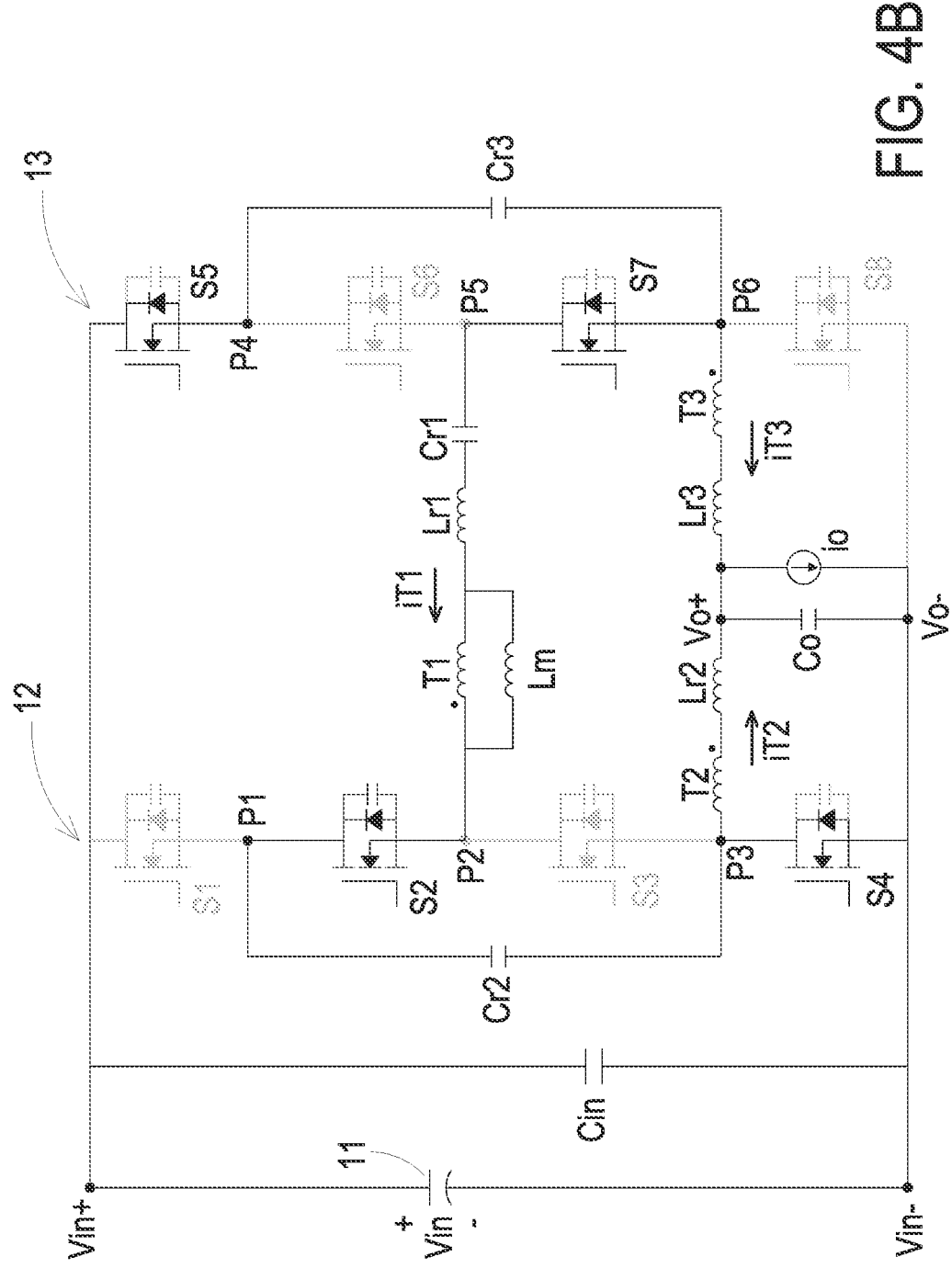
FIG. 4B is a schematic circuit diagram illustrating the current loop of the power conversion circuit as shown in FIG. 2B in the time interval between time t2 and time t3.

FIG. 3 is a schematic timing waveform diagram illustrating voltages and currents of associated components in the power conversion circuit as shown in FIG. 2B. FIG. 4A is a schematic circuit diagram illustrating the current loop of the power conversion circuit as shown in FIG. 2B in the time interval between time t0 and time t1. FIG. 4B is a schematic circuit diagram illustrating the current loop of the power conversion circuit as shown in FIG. 2B in the time interval between time t2 and time t3. In FIG. 3, Vgs1/3/6/8 denote the gate-source voltages of the first switch S1, the third switch S3, the sixth switch S6 and the eighth switch S8, respectively. Moreover, Vgs2/4/5/7 denote the gate-source voltages of the second switch S2, the fourth switch S4, the fifth switch S5 and the seventh switch S7, respectively. Moreover, Vds1/Vds2/Vds3/Vds4 denote the drain-source voltages of the first switch S1, the second switch S2, the third switch S3 and the fourth switch S4, respectively. Moreover, iLm denotes the magnetized current flowing through the equivalent magnetized inductor Lin, and iT1, iT2 and iT3 denote the currents flowing through the first winding T1, the second winding T2 and the third winding T3, respectively. In FIGS. 4A and 4B, the darker lines denote the current loops. For simplifying the analysis, the inductance of the second inductor Lr2 and the inductance of the third inductor Lr3 are made equal, and the ratio K of the turn number N1 of the first winding T1 to the turn number N2 of the second winding T2 (or the turn number of the third winding T3) is fixed.

As shown in FIG. 3, the time interval between time t0 and time t4 is equal to one switching cycle. The on/off states of the first switch S1, the third switch S3, the sixth switch S6 and the eighth switch S8 are identical. The on/off states of the second switch S2, the fourth switch S4, the fifth switch S5 and the seventh switch S7 are identical. The phase difference between the control signal for controlling the first switch S1, the third switch S3, the sixth switch S6 and the eighth switch S8 and the control signal for controlling the second switch S2, the fourth switch S4, the fifth switch S5 and the seventh switch S7 is 180 degrees. The duty cycle of each of the switches S1, S2, S3, S4, S5, S6, S7 and S8 is 50%. In case that a dead time exists, the duty cycle is slightly lower than 50%.

In FIG. 3, the time interval between time t1 and time t2 is a dead time, and the time interval between time t3 and time t4 is also a dead time. During the dead time, the magnetized current iLm charges and discharges the parasitic capacitors of the corresponding switches, and the drain-source voltages of the switches to be turned on drop to zero at the end of the dead time. For example, during the dead time of the first half cycle (i.e., the time interval between time t1 and time t2), the magnetized current iLm charges the parasitic capacitors of the first switch S1, the third switch S3, the sixth switch S6 and the eighth switch S8, and the magnetized current iLm discharges the parasitic capacitors of the second switch S2, the fourth switch S4, the fifth switch S5 and the seventh switch S7. Consequently, the drain-source voltages of the second switch S2, the fourth switch S4, the fifth switch S5 and the seventh switch S7 to be turned on drop to zero at the end of the dead time (i.e., at time t2). In addition, the turn-off currents corresponding to the second switch S2, the fourth switch S4, the fifth switch S5 and the seventh switch S7 at time t2 are also zero. Moreover, during the dead time of the second half cycle (i.e., the time interval between time t3 and time t4), the magnetized current iLm charges the parasitic capacitors of the second switch S2, the fourth switch S4, the fifth switch S5 and the seventh switch S7, and the magnetized current iLm discharges the parasitic capacitors of the first switch S1, the third switch S3, the sixth switch S6 and the eighth switch S8. Consequently, the drain-source voltages of the first switch S1, the third switch S3, the sixth switch S6 and the eighth switch S8 to be turned on drop to zero at the end of the dead time (i.e., at time t4). In addition, the turn-off currents corresponding to the first switch S1, the third switch S3, the sixth switch S6 and the eighth switch S8 at time t4 are also zero. In other words, the drain-source voltages of the switches to be turned on drop to zero at the end of the dead time (e.g., times t2 and t4). Consequently, the zero voltage switching function can be achieved, and the switching loss can be reduced. Since the dead time is much shorter than the on time duration of each switch, the changes of other variables during the dead time can be ignored.

Please refer to FIGS. 3 and 4A. In the time interval between time t0 and time t1, the first switch S1, the third switch S3, the sixth switch S6 and the eighth switch S8 are turned on, and the second switch S2, the fourth switch S4, the fifth switch S5 and the seventh switch S7 are turned off. The magnetized current iLm rises linearly. The operations of the power conversion circuit in this working state can be shown in FIG. 4A. In this working state, the power conversion circuit 1 is equivalent to two resonant branches, including a first resonant branch and a second resonant branch.

The first resonant branch includes the second resonant capacitor Cr2 and a fourth inductor whose inductance is (K+4) times of the inductance of Lr2. The second resonant capacitor Cr2 and the fourth inductor are connected in series. The first resonant frequency fs1 of the first resonant branch is expressed by the following mathematic formula:

$$fs1 = \frac{1}{2\pi\sqrt{Lr2*(k+4)*Cr2}},$$

In the above mathematic formula, Cr2 is the capacitance of the second resonant capacitor, Lr2 is the inductance of the second inductor, and K is a ratio of the turn number N1 of the first winding T1 to the turn number N2 of the second winding T2 (or the turn number of the third winding T3).

The second resonant branch includes the first resonant capacitor Cr1, the third resonant capacitor Cr3, the first inductor Lr1 and an equivalent inductor whose inductance is ((K+2)×(K+1)+2) times of the inductance of Lr2. The first resonant capacitor Cr1, the third resonant capacitor Cr3, the first inductor Lr1 and the equivalent inductor are connected in series. The second resonant frequency fs2 of the second resonant branch is expressed by the following mathematic formula:

$$fs2 = \frac{1}{2\pi\sqrt{[Lr2*[(k+2)*(K+1)+2]+Lr1]*\left(1/\left(\frac{1}{Cr_1}+\frac{1}{Cr_2}\right)\right)}},$$

In the above mathematic formula, Cr1 is the capacitance of the first resonant capacitor, Cr3 is the capacitance of the third resonant capacitor, Lr1 is the inductance of the first inductor, Lr2 is the inductance of the second inductor, and K is a ratio of the turn number N1 of the first winding T1 to the turn number N2 of the second winding T2 (or the turn number of the third winding T3).

For achieving the better working state of the power conversion circuit 1, the capacitances of the resonant capacitors Cr1, Cr2 and Cr3 are specially selected. Consequently, the first resonant frequency fs1 and the second resonant frequency fs2 are equal. Especially, each of the first resonant frequency fs1 and the second resonant frequency fs2 is equal to the switching frequency of each of the first switch S1, the third switch S3, the sixth switch S6 and the eighth switch S8. Under this circumstance, the current flowing through each of the first winding T1, the second winding T2 and the third winding T3 of the transformer 14 is obtained by superposing the magnetized current and a sinusoidal current. As shown in FIG. 3, the waveforms of the first winding current iT1, the second winding current iT2 and the third winding current iT3 are approximately sinusoidal waves.

Please refer to FIG. 4A again. In this working state, the power conversion circuit 1 has three current loops, i.e., a first current loop, a second current loop and a third current loop.

The first current loop is defined by the third resonant capacitor Cr3, the sixth switch S6, the first resonant capacitor Cr1, the first inductor Lr1 (i.e., the first winding T1), the third switch S3, the second inductor Lr2 (i.e., the second winding T2), the output positive terminal Vo+, the output negative terminal Vo− and the eighth switch S8 collaboratively. A first current flows through the first current loop. In the first current loop, the electric energy stored in the third resonant capacitor Cr3 is transferred to the load by the resonance between the first inductor Lr1, the second inductor Lr2, the third resonant capacitor Cr3 and the first resonant capacitor Cr1.

The second current loop is defined by the input positive terminal Vin+, the first switch S1, the second resonant capacitor Cr2, the second inductor Lr2 (i.e., the second winding T2), the output positive terminal Vo+, the output negative terminal Vo− and the input negative terminal Vin− collaboratively. A second current flows through the second current loop. In the second current loop, a portion of the electric energy of the input power stored in the second resonant capacitor Cr2. The other portion of the electric energy is transferred to the load by the resonance between the second inductor Lr2 and the second resonant capacitor Cr2.

The third current loop is defined by the third winding T3, the third inductor Lr3, the output positive terminal Vo+, the output negative terminal Vo− and the eighth switch S8 collaboratively. A third current flows through the third current loop.

As mentioned above, only the first current of the first current loop flows through the first winding T1. That is, the first winding current iT1 flowing through the first winding T1 is composed of the first current only. Consequently, the amplitude of the first winding current iT1 is equal to the amplitude of the first current.

Moreover, the first current of the first current loop and the second current of the second current loop flow through the second winding T2. That is, the second winding current iT2 flowing through the second winding T2 is composed of the first current and the second current. Consequently, the amplitude of the second winding current iT2 is equal to the sum of the amplitude of the first current and the amplitude of the second current. Since the amplitude of the first current is equal to the amplitude of the second current, the amplitude of the second winding current iT2 is equal to two times the amplitude of the first current or two times the amplitude of the second current. For illustration, the amplitude of the second winding current iT2 is equal to two times the amplitude of the second current (i.e., the input current) in the following analysis.

Due to the coupling relationship between the first winding T1, the second winding T2 and the third winding T3 of the transformer 14, the amplitude of the third winding current iT3 flowing through the third winding T3 is equal to the sum of K times the amplitude of the first current, the amplitude of the first current and the amplitude of the second current, wherein K is the ratio of the turn number N1 of the first winding T1 to the turn number N2 of the second winding T2 (or the turn number of the third winding T3). Since the amplitude of the first current is equal to the amplitude of the second current, the amplitude of the third winding current iT3 is equal to (K+2) times the amplitude of the first current or (K+2) times the amplitude of the second current. For illustration, the amplitude of the third winding current iT3 is equal to (K+2) times the amplitude of the second current in the following analysis.

As shown in FIG. 4A, the output current io from the power conversion circuit 1 is the sum of the second winding current iT2 and the third winding current iT3. Consequently, the amplitude of the output current io is equal to the sum of two times the amplitude of the second current and (K+2) times the amplitude of the second current. That is, the amplitude of the output current io is equal to (K+4) times the amplitude of the second current.

Please refer to FIGS. 3 and 4B. In the time interval between time t2 and time t3, the second switch S2, the fourth switch S4, the fifth switch S5 and the seventh switch S7 are turned on, and the first switch S1, the third switch S3, the sixth switch S6 and the eighth switch S8 are turned off. The magnetized current iLm drops linearly. The operations of the power conversion circuit in this working state can be shown in FIG. 4B. In this working state, the power conversion circuit 1 is equivalent to two resonant branches, including a first resonant branch and a second resonant branch. The two resonant branches are similar to those of FIG. 4A. Similarly, the capacitance of the resonant capacitors Cr1, Cr2 and Cr3 are specially selected. Consequently, the first resonant frequency fs1 and the second resonant frequency fs2 are equal. Especially, each of the first resonant frequency fs1 and the second resonant frequency fs2 is equal to the switching frequency of each of the second switch S2, the fourth switch S4, the fifth switch S5 and the seventh switch S7.

Please refer to FIG. 4B again. In this working state, the power conversion circuit 1 has three current loops, i.e., a first current loop, a second current loop and a third current loop.

The first current loop is defined by the second resonant capacitor Cr2, the fourth switch S4, the output negative terminal Vo−, the output positive terminal Vo+, the third inductor Lr3 (i.e., the third winding T3), the seventh switch S7, the first resonant capacitor Cr1, the first inductor Lr1 (i.e., the first winding T1) and the second switch S2 collaboratively. A first current flows through the first current loop. In the first current loop, the electric energy stored in the second resonant capacitor Cr2 is transferred to the load by the resonance between the first inductor Lr1, the third inductor Lr3, the second resonant capacitor Cr2 and the first resonant capacitor Cr1.

The second current loop is defined by the input positive terminal Vin+, the fifth switch S5, the second resonant capacitor Cr3, the third inductor Lr3 (i.e., the third winding T3), the output positive terminal Vo+, the output negative terminal Vo− and the input negative terminal Vin− collaboratively. A second current flows through the second current loop. In the second current loop, the electric energy of the input power stored in the third resonant capacitor Cr3 is transferred to the load by the resonance between the third inductor Lr3 and the third resonant capacitor Cr3.

The third current loop is defined by the second winding T2, the second inductor Lr2, the output positive terminal Vo+, the output negative terminal Vo− and the fourth switching S4 collaboratively. A third current flows through the third current loop.

As mentioned above, only the first current of the first current loop flows through the first winding T1. That is, a first winding current iT1 flowing through the first winding T1 is composed of the first current only. Consequently, the amplitude of the first winding current iT1 is equal to the amplitude of the first current.

The first current of the first current loop and the second current of the second current loop flow through the third winding T3. That is, a third winding current iT3 flowing through the third winding T3 is composed of the first current and the second current. Consequently, the amplitude of the third winding current iT3 is equal to the sum of the amplitude of the first current and the second current. Moreover, the amplitude of the first current is equal to the amplitude of the second current. Consequently, the amplitude of the third winding current iT3 is equal to the two times the amplitude of the first current or the second current. For illustration, the amplitude of the third winding current iT3 is equal to two times the amplitude of the second current (i.e., the input current) in the following analysis.

Due to the coupling relationship between the first winding T1, the second winding T2 and the third winding T3 of the transformer 14, the amplitude of the second winding current iT2 flowing through the second winding T2 is equal to the sum of K times the amplitude of the first current and the amplitude of the second current, wherein K is the ratio of the turn number N1 of the first winding T1 to the turn number N2 of the second winding T2 (or the turn number of the third winding T3). Since the amplitude of the first current is equal to the amplitude of the second current, the amplitude of the second winding current iT2 is equal to (K+2) times the amplitude of the first current or (K+2) times the amplitude of the second current. For illustration, the amplitude of the second winding current iT2 is equal to (K+2) times the amplitude of the second current in the following analysis.

As shown in FIG. 4B, the output current io from the power conversion circuit 1 is the sum of the second winding current iT2 and the third winding current iT3. Consequently, the amplitude of the output current io from the power conversion circuit 1 is equal to the sum of two times the amplitude of the second current and (K+2) times the amplitude of the second current, i.e., (K+4) times the amplitude of the second current.

As mentioned above, the on/off states of the plurality of switches in the first bridge arm 12 and the second bridge arm 13 of the power conversion circuit 1 are specially designed, and the first winding T1, the second winding T2 and the third winding T3 of the transformer 14 are coupled with each other. Consequently, the relationship between the output voltage Vo and the input voltage Vin can be expressed as: Vo=Vin/(K+4), wherein K is the ratio of the turn number N1 of the first winding T1 to the turn number N2 of the second winding T2 (or the turn number of the third winding T3). In other words, by changing the turn number N1 of the first winding T1 and the turn number N2 of the second winding T2 (or the turn number of the third winding T3), the ratio of the input voltage Vin to the output voltage Vo can be adjustable. For example, if the K=N1/N2=1, the ratio of the input voltage Vin to the output voltage Vo is 5:1. Since the ratio of the input voltage Vin to the output voltage Vo is adjustable, applications of the power conversion circuit 1 are expanded. In case that the ratio K of the turn number N1 of the first winding T1 to the turn number N2 of the second winding T2 (or the turn number of the third winding T3) is not equal to 1, the ratio of the input voltage Vin to the output voltage Vo is determined according to the mathematic formula: Vo=Vin/(K+4). Moreover, the relationship between the output voltage Vo and the input voltage Vin may be expressed by the following general formula: Vo=Vin×[N2/((N1+N2×2)+2)].

In some embodiments, the resonant frequencies of the two resonant branches of the power conversion circuit 1 are not equal to the switching frequency. The resonant frequencies of the two resonant branches can be made different by selecting the first resonant capacitor Cr1, the second resonant capacitor Cr2 and the third resonant capacitor Cr3 with the corresponding capacitance values.

Figure 5:
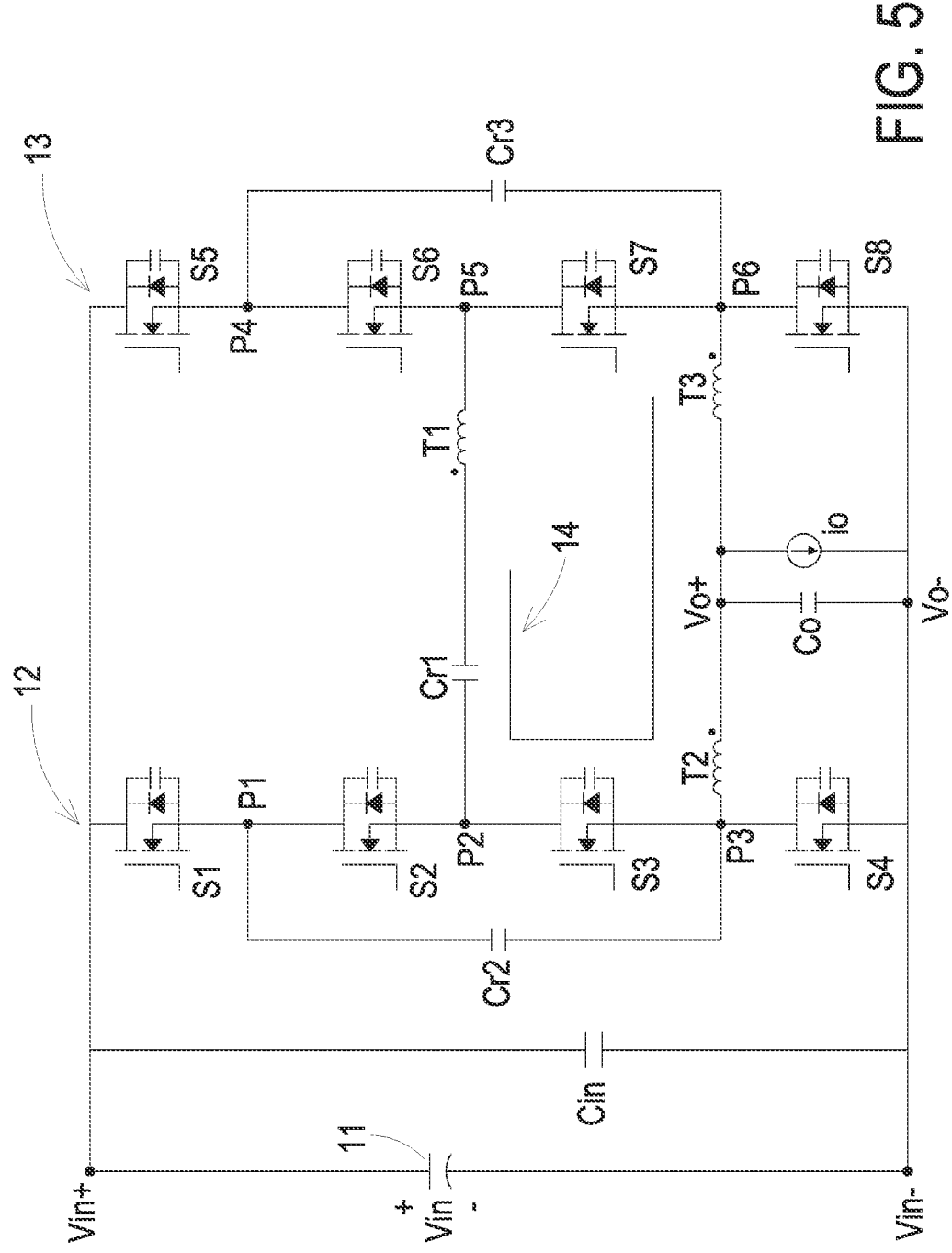
FIG. 5 is a schematic circuit diagram illustrating the circuitry structure of a power conversion circuit according to a second embodiment of the present disclosure.

FIG. 5 is a schematic circuit diagram illustrating the circuitry structure of a power conversion circuit according to a second embodiment of the present disclosure. The circuitry structure and the control method of the power conversion circuit 1a of this embodiment are similar to those of the power conversion circuit 1 of the first embodiment. In comparison with the power conversion circuit 1 of the first embodiment, the positions of the first winding T1 and the first resonant capacitor Cr1 in the power conversion circuit 1a of this embodiment are exchanged. In this embodiment, the first terminal of the first resonant capacitor Cr1 is electrically connected with the second node P2, the second terminal of the first resonant capacitor Cr1 is electrically connected with the first terminal of the first winding T1, and the second terminal of the first winding T1 is electrically connected with the fifth node P5.

Figure 6:
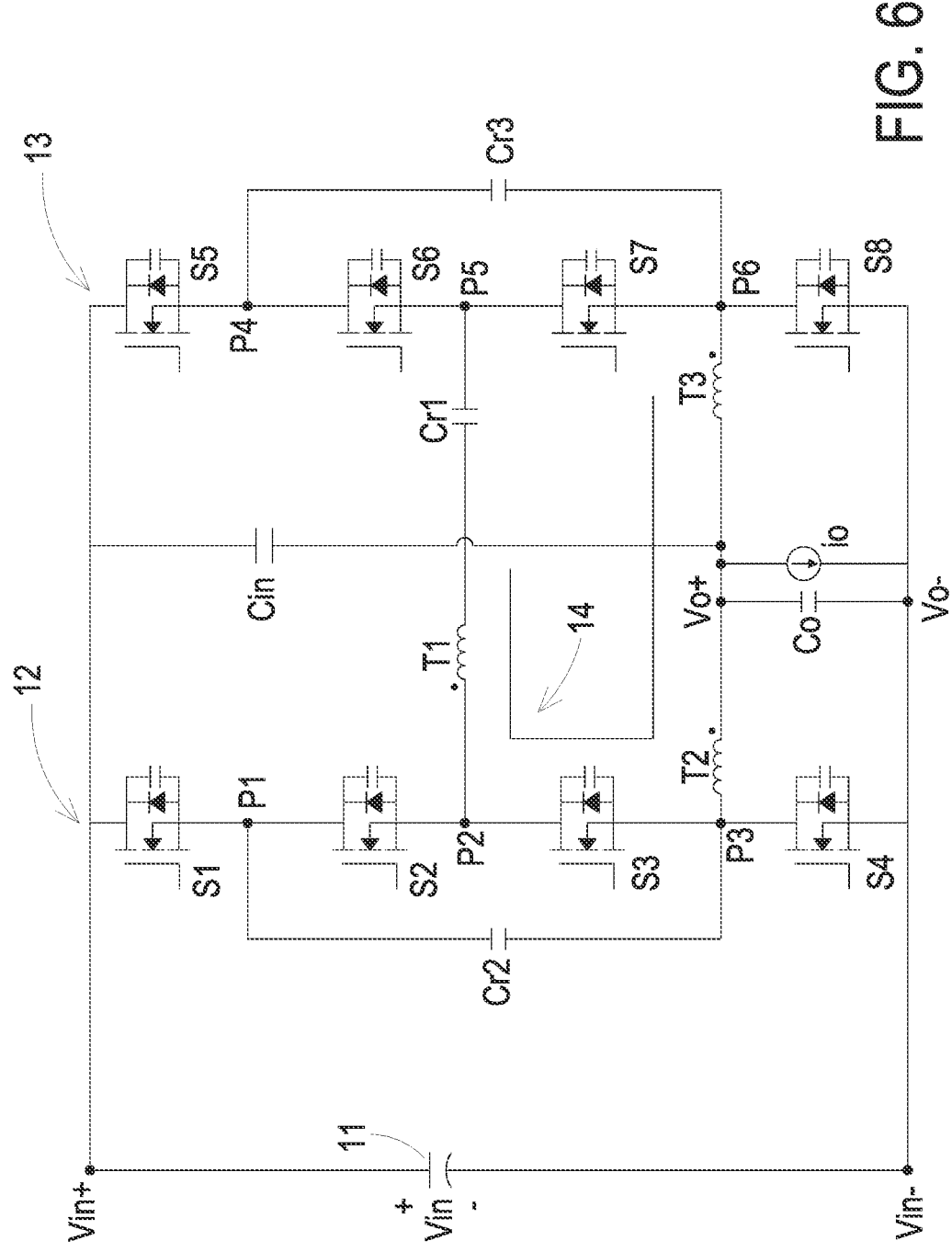
FIG. 6 is a schematic circuit diagram illustrating the circuitry structure of a power conversion circuit according to a third embodiment of the present disclosure.

FIG. 6 is a schematic circuit diagram illustrating the circuitry structure of a power conversion circuit according to a third embodiment of the present disclosure. The circuitry structure and the control method of the power conversion circuit 1b of this embodiment are similar to those of the power conversion circuit 1 of the first embodiment. In comparison with the power conversion circuit 1, the position of the input capacitor Cin in the power conversion circuit 1b of this embodiment is changed. That is, the input capacitor Cin is connected between the input positive terminal Vin+ and the output positive terminal Vo+. Consequently, the capacitor with a lower withstanding voltage can be used as the input capacitor Cin.

In an embodiment, in order to activate the power conversion circuit 1b, the second resonant capacitor Cr2 and the third resonant capacitor Cr3 need to be pre-charged. Consequently, during the startup process of the power conversion circuit 1b, the voltages across the second resonant capacitor Cr2 and the third resonant capacitor Cr3 are high enough. Consequently, the damage on other electronic components will be avoided. Moreover, the power conversion circuit further includes a pre-charging circuit to increase the voltages across the second resonant capacitor Cr2 and the third resonant capacitor Cr3.

Figure 7:
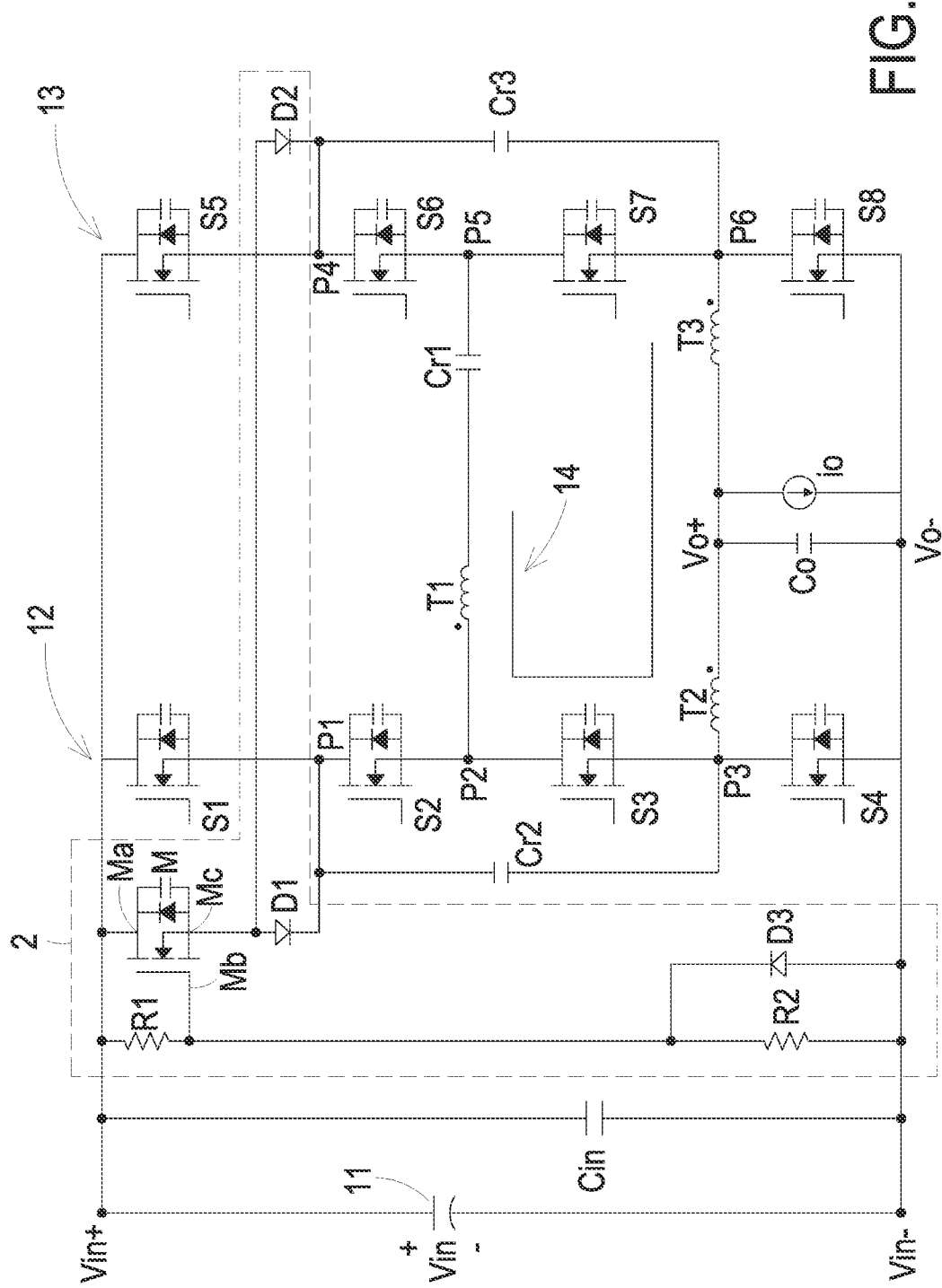
FIG. 7 is a schematic circuit diagram illustrating the circuitry structure of the power conversion circuit according to a fourth embodiment of the present disclosure.
Figure 8:
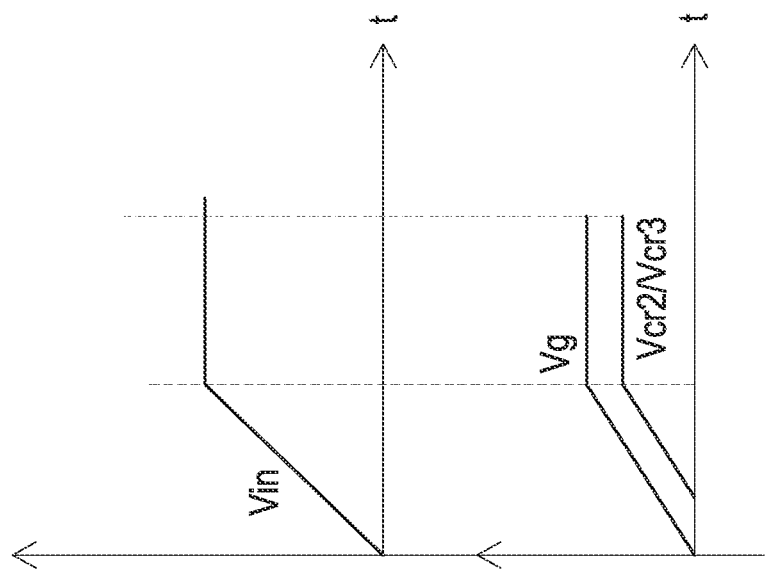
FIG. 8 is a schematic timing waveform diagram illustrating associated voltages in the power conversion circuit as shown in FIG. 7.

FIG. 7 is a schematic circuit diagram illustrating the circuitry structure of the power conversion circuit according to a fourth embodiment of the present disclosure. FIG. 8 is a schematic timing waveform diagram illustrating associated voltages in the power conversion circuit as shown in FIG. 7. The circuitry structure and the control method of the power conversion circuit 1c are similar to those of the power conversion circuit 1 of the first embodiment. In comparison with the power conversion circuit 1, the power conversion circuit 1c of this embodiment further includes a pre-charging circuit 2. The pre-charging circuit 2 includes a first resistor R1, a second resistor R2, an auxiliary switch M, a first clamp switch D1 and a second clamp switch D2.

Each of the first clamp switch D1 and the second clamp switch D2 has a first terminals and a second terminal. In the following embodiment, the first clamp switch D1 and the second clamp switch D2 are respectively a first diode D1 and a second diode D2. Moreover, the first terminals of the two clamp switches D1 and D2 are the anodes of the corresponding diodes, and the second terminals of the two clamp switches D1 and D2 are the cathodes of the corresponding diodes.

The first resistor R1 and the second resistor R2 are connected in series between the input positive terminal Vin+ and the input negative terminal Vin−. The first terminal Ma of the auxiliary switch M is electrically connected with the input positive terminal Vin+. The second terminal Mb of the auxiliary switch M is electrically connected with a node between the first resistor R1 and the second resistor R2. The third terminal Mc of the auxiliary switch M is electrically connected the anode of the first diode D1 and the anode of the second diode D2. The cathode of the first diode D1 is electrically connected with the first node P1. The cathode of the second diode D2 is electrically connected with the fourth node P4. In an embodiment, the pre-charging circuit 2 of the power conversion circuit 1c further includes a third diode D3. The cathode of the third diode D3 is electrically connected to the first resistor R1 and the second resistor R2. The anode of the third diode D3 is electrically connected with the input negative terminal Vin−.

Please refer to FIGS. 7 and 8 again. After the voltage source 11 provides the input voltage Vin, the voltage Vg at the second terminal Mb of the auxiliary switch M increases with the increasing input voltage Vin, and thus the auxiliary switch M can be turned on. The input voltage Vin pre-charges the second resonant capacitor Cr2 through the auxiliary switch M and the first diode D1. Consequently, the voltage Vcr2 across the second resonant capacitor Cr2 increases with the increasing input voltage Vin. In addition, the input voltage Vin pre-charges the third resonant capacitor Cr3 through the auxiliary switch M and the second diode D2. Consequently, the voltage Vcr3 across the third resonant capacitor Cr3 increases with the increasing input voltage Vin.

In an embodiment, the voltage Vg at the second terminal Mb of the auxiliary switch M is equal to Vin×R1/(R1+R2). If the voltage Vg at the second terminal Mb of the auxiliary switch M is too high, the voltage Vcr2 across the second resonant capacitor Cr2 and the voltage Vcr3 across the third resonant capacitor Cr3 may exceed the steady state working voltage. For avoiding this problem, the ratio of the resistance of the first resistor R1 to the resistance of the second resistor R2 needs to be specially determined. Consequently, the relationship between the voltage Vg at the second terminal Mb of the auxiliary switch M and the input voltage Vin can be expressed by the following mathematic formula:

$$Vg < Vin \times [1 - 2 \times N2/((N1 + N2 \times 2) + 2)] + Vth$$

In the above mathematic formula, Vg is the voltage at the second terminal Mb of the auxiliary switch M, Vin is the input voltage, N1 is the turn number of the first winding T1, N2 is turn umber of the second winding T2, N2 is also the turn number of the third winding T3, and Vth is a threshold voltage to turn on the auxiliary switch M.

Preferably but not exclusively, the auxiliary switch M is a MOSFET switch, a BJT switch, a SiC switch or a GaN switch, and the switches S1 to S8 are MOSFET switches. The source terminals of the first switch S1 and the fifth switch S5 are electrically connected with the second resonant capacitor Cr2 and the third resonant capacitor Cr3, respectively. Consequently, as the voltage Vcr2 across the second resonant capacitor Cr2 and the voltage Vcr3 across the third resonant capacitor Cr3 increase with the increasing input voltage Vin, the drain-source voltages of the first switch S1 and the fifth switch S5 decrease. That is, the switches with a low withstanding voltage can be used as the first switch S1 and the fifth switch S5. Consequently, the conversion efficiency of the power conversion circuit 1c in the steady state is enhanced.

For example, the predetermined voltage is equal to the difference between the input voltage Vin and two times the output voltage Vo (i.e., Vin−2×Vo). When the voltage Vcr2 across the second resonant capacitor Cr2 and the voltage Vcr3 across the third resonant capacitor Cr3 reach the predetermined voltages, the power conversion circuit 1c is switched from the pre-charged state to the steady state. Meanwhile, the electric energy from the auxiliary switch M is blocked by the first diode D1 and the second diode D2, and the pre-charging circuit 2 is disabled.

Figure 9:
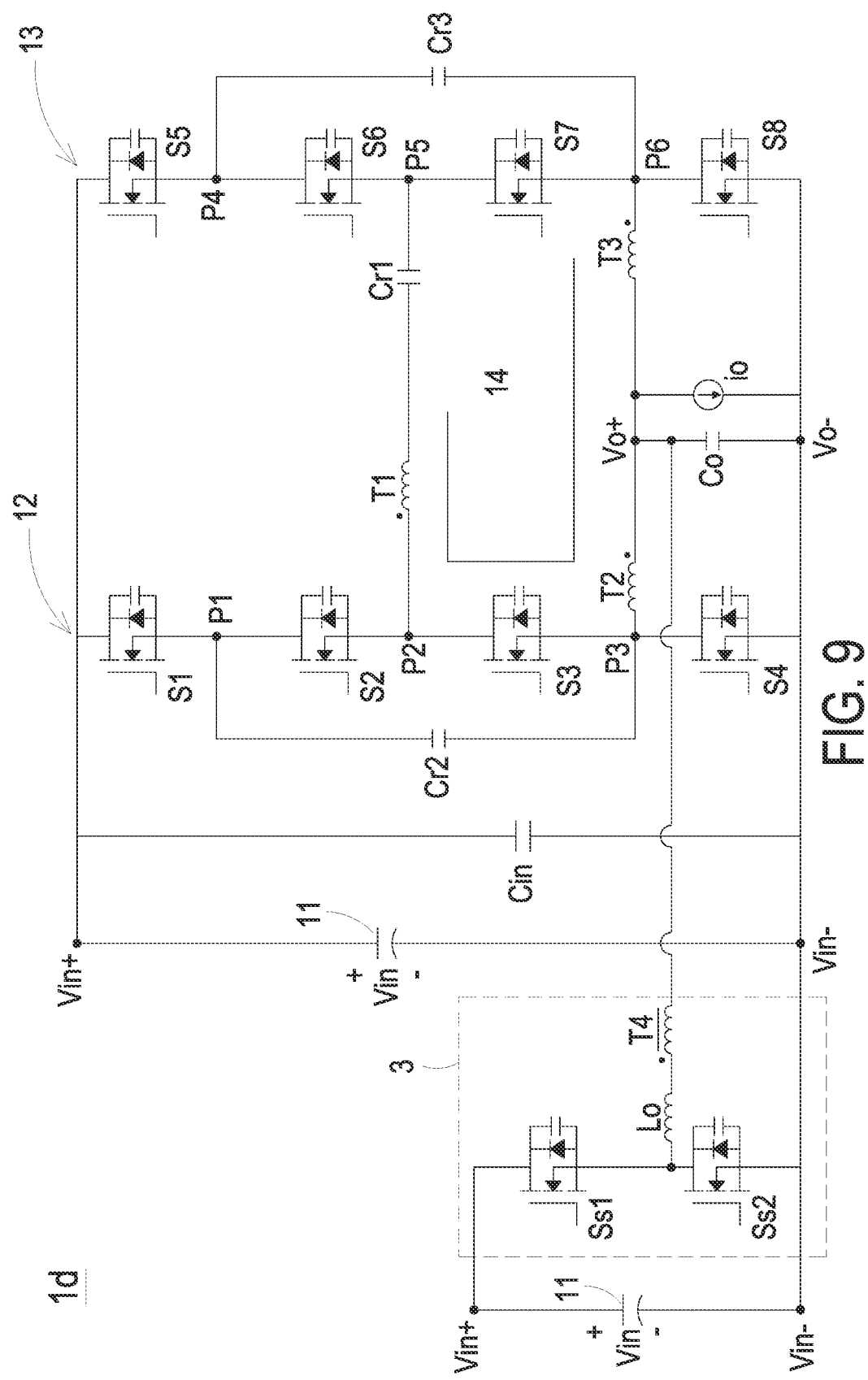
FIG. 9 is a schematic circuit diagram illustrating the circuitry structure of a power conversion circuit according to a fifth embodiment of the present disclosure.

FIG. 9 is a schematic circuit diagram illustrating the circuitry structure of the power conversion circuit according to a fifth embodiment of the present disclosure. The circuitry structure and the control method of the power conversion circuit 1d are similar to those of the power conversion circuit 1 of the first embodiment. In comparison with the power conversion circuit 1, the power conversion circuit 1d of this embodiment further includes a start circuit 3. By the start circuit 3, the second resonant capacitor Cr2, the third resonant capacitor Cr3 and the output capacitor Co can be pre-charged.

In an embodiment, the start circuit 3 includes an upper switch Ss1, a lower switch Ss2, a fourth winding T4 and an output inductor Lo. The upper switch Ss1 and the lower switch Ss2 are connected in series between the input positive terminal Vin+ and the input negative terminal Vin−. The on/off states of the upper switch Ss1 and the on/off states of the lower switch Ss2 are complementary to each other. The fourth winding T4 is coupled with the first winding T1, the second winding T2 and the third winding T3 of the transformer 14. The position of the dotted terminal of the fourth winding T4 is not restricted. The output inductor Lo and the fourth winding T4 are connected with each other in series between the node connecting the upper switch Ss1 and the lower switch Ss and the output positive terminal Vo+.

Figure 10:
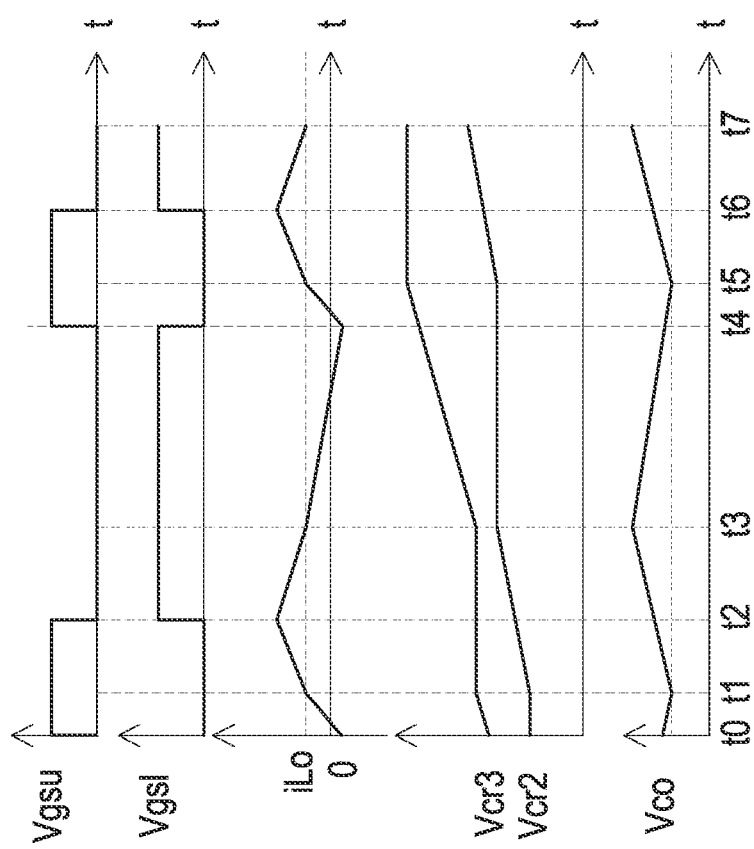
FIG. 10 is a schematic timing waveform diagram illustrating voltages and currents of associated components in the power conversion circuit as shown in FIG. 9.
Figure 11A:
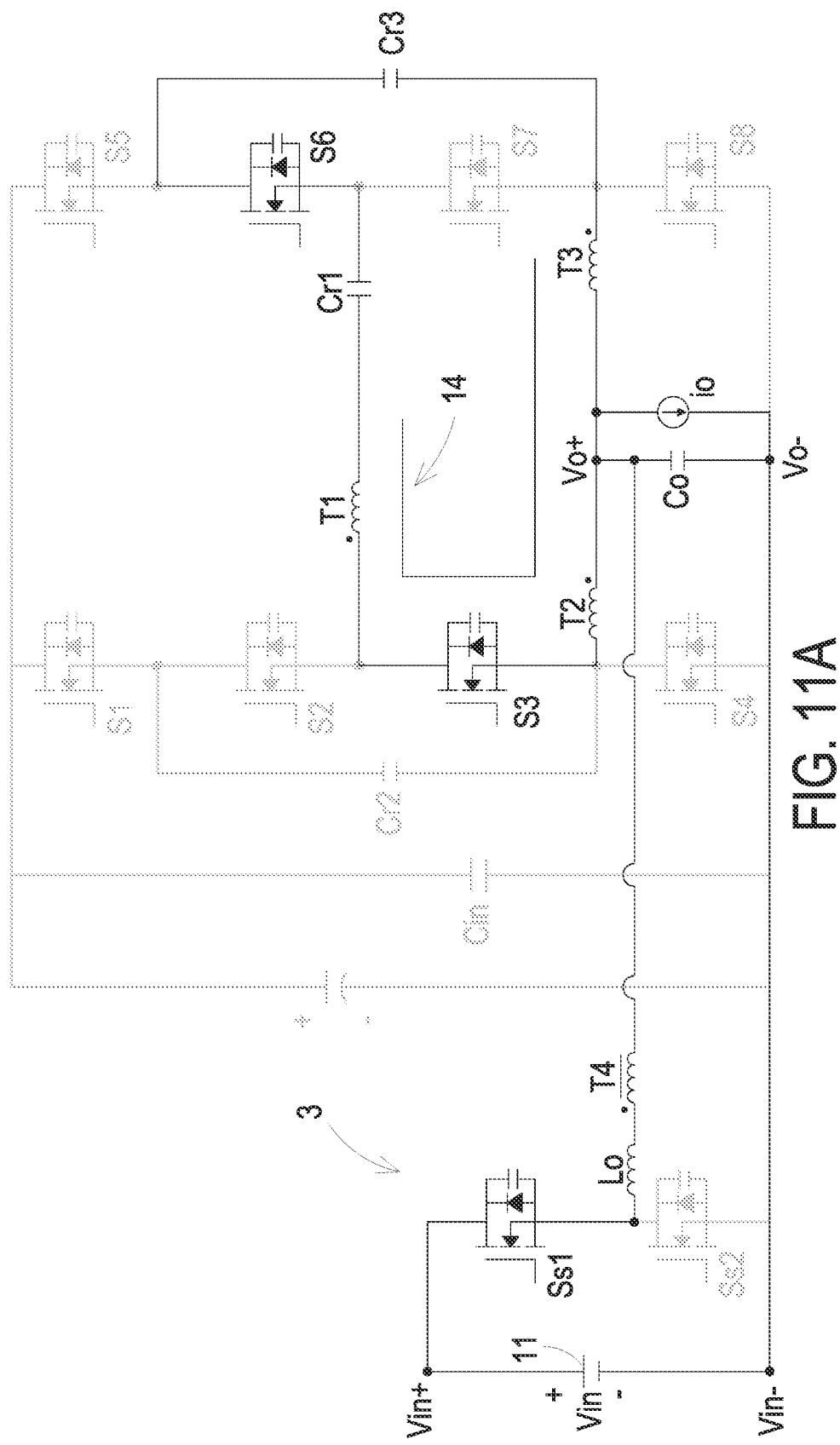
FIG. 11A is a schematic circuit diagram illustrating the current loop of the power conversion circuit as shown in FIG. 9 in the time interval between time t0 and time t1.
Figure 11B:
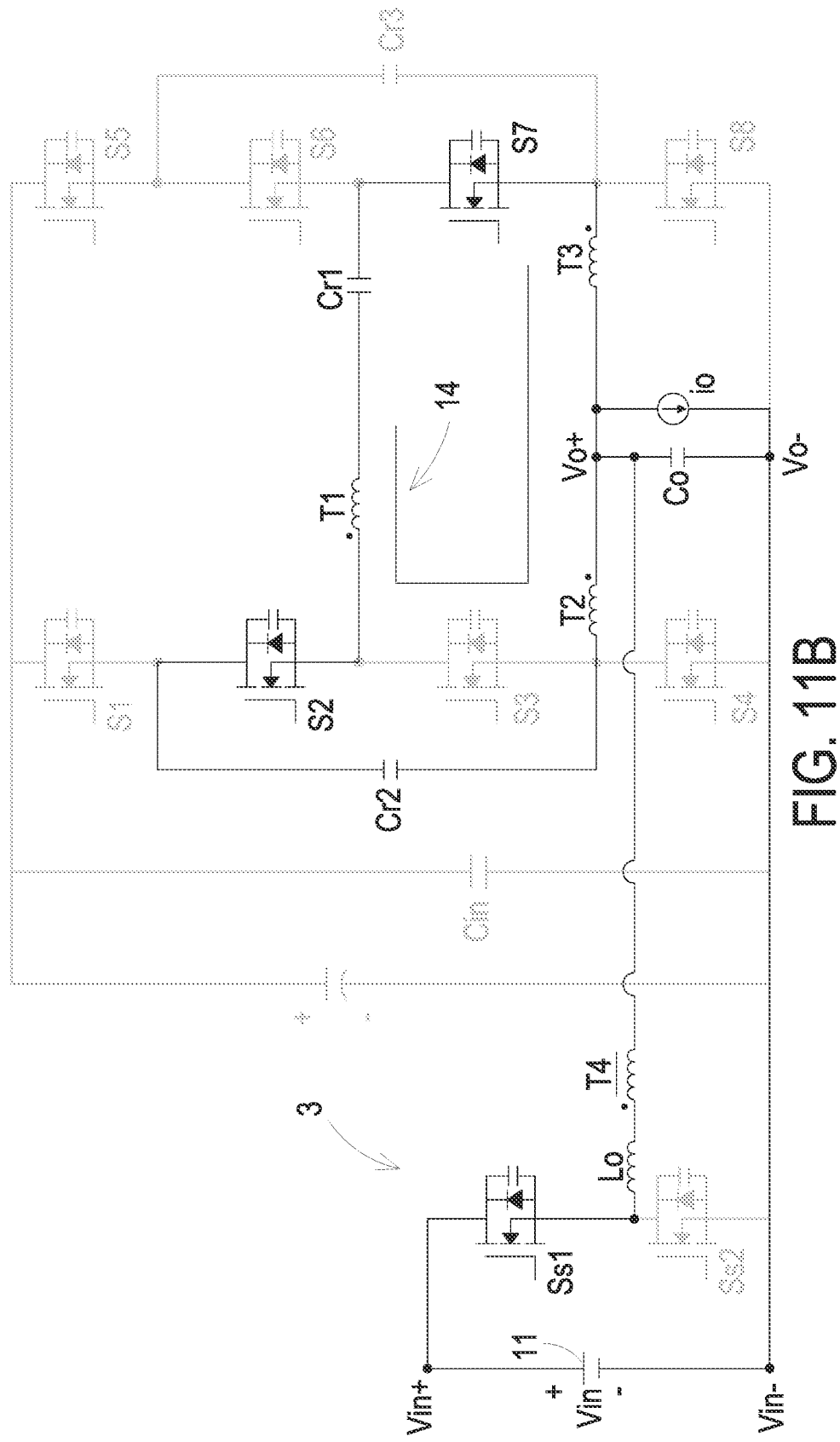
FIG. 11B is a schematic circuit diagram illustrating the current loop of the power conversion circuit as shown in FIG. 9 in the time interval between time t1 and time t2.
Figure 11C:
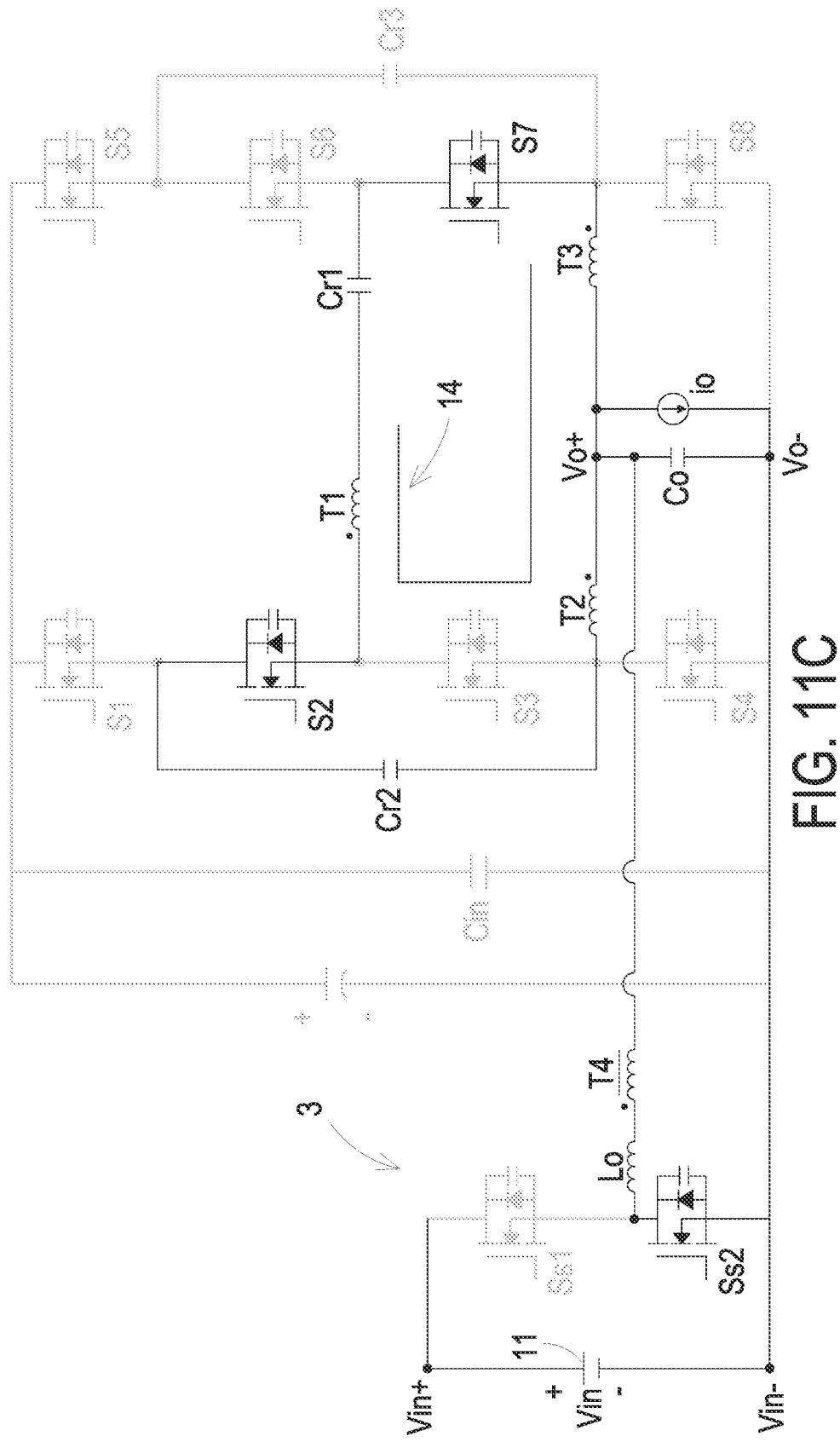
FIG. 11C is a schematic circuit diagram illustrating the current loop of the power conversion circuit as shown in FIG. 9 in the time interval between time t2 and time t3.
Figure 11D:
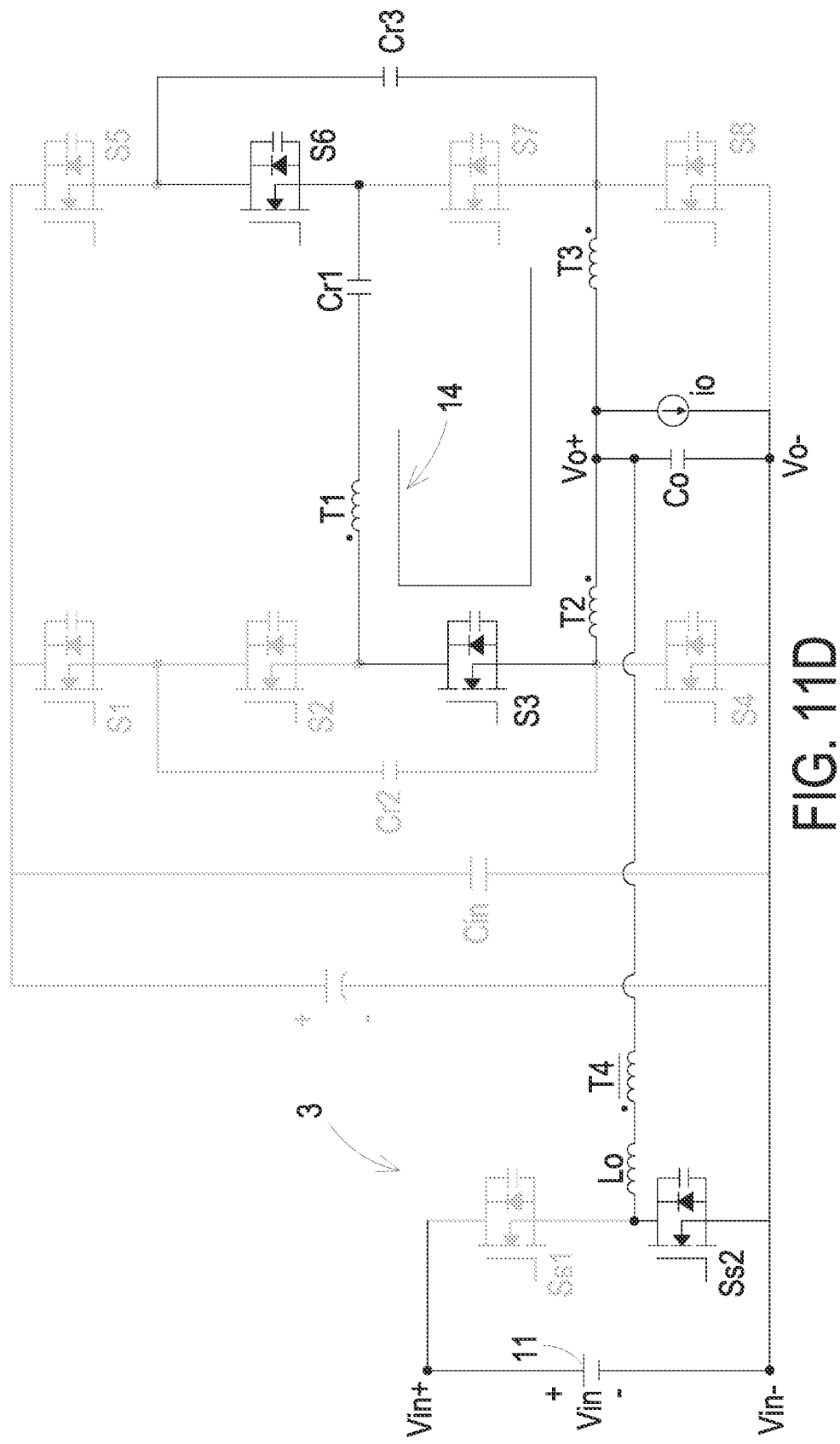
FIG. 11D is a schematic circuit diagram illustrating the current loop of the power conversion circuit as shown in FIG. 9 in the time interval between time t3 and time t4.

FIG. 10 is a schematic timing waveform diagram illustrating voltages and currents of associated components in the power conversion circuit as shown in FIG. 9. FIG. 11A is a schematic circuit diagram illustrating the current loop of the power conversion circuit as shown in FIG. 9 in the time interval between time t0 and time t1. FIG. 11B is a schematic circuit diagram illustrating the current loop of the power conversion circuit as shown in FIG. 9 in the time interval between time t1 and time t2. FIG. 11C is a schematic circuit diagram illustrating the current loop of the power conversion circuit as shown in FIG. 9 in the time interval between time t2 and time t3. FIG. 11D is a schematic circuit diagram illustrating the current loop of the power conversion circuit as shown in FIG. 9 in the time interval between time t3 and time t4.

For example, the upper switch Ss1 and the lower switch Ss2 are MOSFET transistors. In FIG. 10, Vgsu denotes the gate-source voltage of the upper switch Ss1, Vgs1 denotes the gate-source voltage of the lower switch Ss2, iLo is the inductor current flowing through the output inductor Lo, Vcr2 is the voltage across the second resonant capacitor Cr2, Vcr3 is the voltage across the third resonant capacitor Cr3, and Vco is the voltage across the output capacitor Co. As shown in FIG. 10, the time interval between time t0 and time t4 is equal to one switching cycle. The on/off states of the upper switch Ss1 and the on/off states of the lower switch Ss2 are complementary to each other. In FIGS. 11A, 11B, 11C and 11D, the darker lines denote the current loops.

Please refer to FIGS. 10 and 11A. In the time interval between time t0 and time t1, the upper switch Ss1 is turned on, and the lower switch Ss2 is turned off. Meanwhile, the current in the start circuit 3 flows through the upper switch Ss1, the output inductor Lo and the fourth winding T4. Consequently, the inductor current iLo flowing through the output inductor Lo rises linearly. The inductor current iLo flowing through the output inductor Lo is lower than DC current component of the output inductor Lo. In addition, the body diodes of the third switch S3 and the sixth switch S6 are turned on. The fourth winding T4 is coupled with the first winding T1, the second winding T2 and the third winding T3 of the transformer 14. The coupled current flows through the third winding T3, the second winding T2, the third switch S3, the first winding T1, the first resonant capacitor Cr1, the sixth switch S6 and the third resonant capacitor Cr3 sequentially. Consequently, the third resonant capacitor Cr3 is pre-charged.

Please refer to FIGS. 10 and 11B. In the time interval between time t1 and time t2, the upper switch Ss1 is turned on, and the lower switch Ss2 is turned off. Meanwhile, the current in the start circuit 3 flows through the upper switch Ss1, the output inductor Lo and the fourth winding T4. Consequently, the inductor current iLo flowing through the output inductor Lo rises linearly. The inductor current iLo flowing through the output inductor Lo is greater than DC current component of the output inductor Lo. The inductor current iLo of the output inductor Lo flows to the output capacitor Co to charge the output capacitor Co. In addition, the body diodes of the second switch S2 and the seventh switch S7 are turned on. The fourth winding T4 is coupled with the first winding T1, the second winding T2 and the third winding T3 of the transformer 14. The coupled current sequentially flows through the second winding T2, the third winding T3, the seventh switch S7, the first resonant capacitor Cr1, the first winding T1, the second switch S2 and the second resonant capacitor Cr2 sequentially. Consequently, the second resonant capacitor Cr2 is pre-charged.

Please refer to FIGS. 10 and 11C. In the time interval between time t2 and time t3, the upper switch Ss1 is turned off, and the lower switch Ss2 is turned on. Meanwhile, the current in the start circuit 3 flows through the lower switch Ss2, the output inductor Lo and the fourth winding T4. Consequently, the inductor current iLo flowing through the output inductor Lo drops linearly. The inductor current iLo flowing through the output inductor Lo is greater than DC current component of the output inductor Lo. The inductor current iLo of the output inductor Lo flows to the output capacitor Co to charge the output capacitor Co. In addition, the body diodes of the second switch S2 and the seventh switch S7 are turned on. The fourth winding T4 is coupled with the first winding T1, the second winding T2 and the third winding T3 of the transformer 14. The coupled current sequentially flows through the second winding T2, the third winding T3, the seventh switch S7, the first resonant capacitor Cr1, the first winding T1, the second switch S2 and the second resonant capacitor Cr2 sequentially. Consequently, the second resonant capacitor Cr2 is pre-charged.

Please refer to FIGS. 10 and 11D. In the time interval between time t3 and time t4, the upper switch Ss1 is turned off, and the lower switch Ss2 is turned on. Meanwhile, the current in the start circuit 3 flows through the lower switch Ss2, the output inductor Lo and the fourth winding T4. Consequently, the inductor current iLo flowing through the output inductor Lo drops linearly. The inductor current iLo flowing through the output inductor Lo is lower than DC current component of the output inductor Lo. In addition, the body diodes of the third switch S3 and the sixth switch S6 are turned on. The fourth winding T4 is coupled with the first winding T1, the second winding T2 and the third winding T3 of the transformer 14. The coupled current flows through the third winding T3, the second winding T2, the third switch S3, the first winding T1, the first resonant capacitor Cr1, the sixth switch S6 and the third resonant capacitor Cr3 sequentially. Consequently, the third resonant capacitor Cr3 is pre-charged.

The operations of the start circuit 3 in the other switching cycles are similar to those mentioned in FIGS. 11A to 11D, and not redundantly described herein. By using the start circuit 3, the second resonant capacitor Cr2, the third resonant capacitor Cr3 and the output capacitor Co can be pre-charged.

When the voltages across the second resonant capacitor Cr2, the third resonant capacitor Cr3 and the output capacitor Co reach the predetermined voltages, the start circuit 3 is disabled. The switches S1 to S8 are operated in the normal working state. The operations of the switches S1 to S8 have been described in FIGS. 3, 4A and 4B.

From the above descriptions, the present disclosure provides the power conversion circuit. The plurality of switches in the first bridge arm and the plurality of switches in the second bridge arm are selectively turned on or turned off. The ratio of the input voltage to the output voltage can be adjustable by changing the turn numbers of the first winding, the second winding and the third winding. In other words, the applications of the power conversion circuit of the present disclosure are expanded. Moreover, the use of the pre-charging circuit or the start circuit can achieve the function of pre-charging the resonant capacitors and the output capacitor.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A power conversion circuit, comprising:
   an input positive terminal, an input negative terminal, an output positive terminal and an output negative terminal, wherein the input negative terminal and the output negative terminal are connected with each other;
   a first bridge arm comprising a first switch, a second switch, a third switch and a fourth switch, which are connected in series between the input positive terminal and the input negative terminal, wherein the first switch and the second switch are connected with a first node, the second switch and the third switch are connected with a second node, and the third switch and the fourth switch are connected with a third node;
   a second bridge arm comprising a fifth switch, a sixth switch, a seventh switch and an eighth switch, which are connected in series between the input positive terminal and the input negative terminal, wherein the fifth switch and the sixth switch are connected with a fourth node, the sixth switch and the seventh switch are connected with a fifth node, and the seventh switch and the eighth switch are connected with a sixth node;
   a transformer comprising a first winding, a second winding and a third winding, which are coupled with each other, wherein the second winding is electrically connected between the third node and the output positive terminal, and the third winding is electrically connected with the sixth node and the output positive terminal;
   a first resonant capacitor, wherein the first resonant capacitor and the first winding are connected in series between the second node and the fifth node;
   a second resonant capacitor electrically connected between the first node and the third node;
   a third resonant capacitor electrically connected between the fourth node and the sixth node; and
   an output capacitor electrically connected between the output positive terminal and the output negative terminal.

2. The power conversion circuit according to claim 1, wherein a first terminal of the first winding is electrically connected with the second node, a second terminal of the first winding is electrically connected with the first resonant capacitor, a first terminal of the second winding and a first terminal of the third winding are electrically connected with the output positive terminal, a second terminal of the second winding is electrically connected with the third node, and a second terminal of the third winding is electrically connected with the sixth node, wherein the first terminal of the first winding, the first terminal of the second winding and the second terminal of the third winding are dotted terminals.

3. The power conversion circuit according to claim 1, wherein a first terminal of the first winding is electrically connected with the second node, a second terminal of the first winding is electrically connected with the fifth node, a first terminal of the second winding and a first terminal of the third winding are electrically connected with the output positive terminal, a second terminal of the second winding is electrically connected with the third node, and a second terminal of the third winding is electrically connected with the sixth node, wherein the first terminal of the first winding, the first terminal of the second winding and the second terminal of the third winding are dotted terminals.

4. The power conversion circuit according to claim 1, wherein a turn number of the first winding is N1, a turn number of the second winding is N2, and a turn number of the third winding is N2, wherein N1 and N2 are positive integers.

5. The power conversion circuit according to claim 1, further comprising an input capacitor, wherein the input capacitor is electrically connected between the input positive terminal and the input negative terminal, or the input capacitor is electrically connected between the input positive terminal and the output positive terminal.

6. The power conversion circuit according to claim 1, further comprising a first inductor, a second inductor and a third inductor, wherein the first inductor, the first winding and the first resonant capacitor are connected in series between the second node and the fifth node, and the first inductor is a leakage inductor of the transformer and/or a first external inductor, wherein the second inductor and the second winding are connected in series between the third node and the output positive terminal, and the second inductor is a leakage inductor of the transformer and/or a second external inductor, wherein the third inductor and the third winding are connected in series between the sixth node and the output positive terminal, and the third inductor is a leakage inductor of the transformer and/or a third external inductor.

7. The power conversion circuit according to claim 1, wherein the transformer further comprises an equivalent magnetized inductor, wherein the equivalent magnetized inductor is connected with the first winding, the second winding or the third winding in parallel.

8. The power conversion circuit according to claim 7, wherein the first switch, the second switch, the third switch, the fourth switch, the fifth switch, the sixth switch, the seventh switch and the eighth switch are selectively turned on or turned off in a switching cycle, wherein during a dead time of the switching cycle, a magnetized current flowing through the equivalent magnetized inductor charges and discharges parasitic capacitors of the corresponding switches, so that a zero voltage switching function is achieved.

9. The power conversion circuit according to claim 1, wherein on/off states of the first switch, the third switch, the sixth switch and the eighth switch are identical, on/off states of the second switch, the fourth switch, the fifth switch and the seventh switch are identical, and a phase difference between a first control signal for controlling the first switch, the third switch, the sixth switch and the eighth switch and a second control signal for controlling the second switch, the fourth switch, the fifth switch and the seventh switch is 180 degrees.

10. The power conversion circuit according to claim 9, wherein a duty cycle of each of the first switch, the second switch, the third switch, the fourth switch, the fifth switch, the sixth switch, the seventh switch and the eighth switch is 50%.

11. The power conversion circuit according to claim 9, wherein when four of the first switch, the second switch, the third switch, the fourth switch, the fifth switch, the sixth switch, the seventh switch and the eighth switch are turned on at a switching frequency, the power conversion circuit is equivalent to a first resonant branch and a second resonant branch, wherein a first resonant frequency of the first resonant branch, a second resonant frequency second resonant branch and the switching frequency are equal, and a current flowing through each of the first winding, the second winding and the third winding is obtained by superposing a magnetized current through an equivalent magnetized inductor of the transformer and a sinusoidal current.

12. The power conversion circuit according to claim 1, wherein a voltage between the input positive terminal and the input negative terminal is an input voltage, a voltage between the output positive terminal and the output negative terminal is an output voltage, and a relationship between the output voltage and the input voltage is expressed by a mathematic formula as: $Vo=Vin \times [N2/((N1+N2 \times 2)+2)]$, wherein Vo is the output voltage, Vin is the input voltage, N1 is a turn number of the first winding, and N2 is a turn number of the second winding or a turn number of the third winding.

13. The power conversion circuit according to claim 1, further comprising a first resistor, a second resistor, an auxiliary switch, a first clamp switch and a second clamp switch, wherein the first resistor and the second resistor are connected in series between the input positive terminal and the input negative terminal, a first terminal of the auxiliary switch is electrically connected with the input positive terminal, a second terminal of the auxiliary switch is electrically connected with a node connecting the first resistor and the second resistor, a third terminal of the auxiliary switch is electrically connected with a first terminal of the first clamp switch and a first terminal of the second clamp switch, a second terminal of the first clamp switch is electrically connected with the first node, and a second terminal of the second clamp switch is electrically connected with the fourth node, wherein a voltage between the input positive terminal and the input negative terminal is an input voltage, and the input voltage charges the second resonant capacitor and the third resonant capacitor through the auxiliary switch, the first clamp switch and the second clamp switch.

14. The power conversion circuit according to claim 1, further comprising an upper switch, a lower switch, a fourth winding and an output inductor, wherein the upper switch and the lower switch are connected in series between the input positive terminal and the input negative terminal, the fourth winding is coupled with the first winding, the second winding and the third winding, and the output inductor and the fourth winding are connected with each other in series between a node connecting the upper switch and the lower switch and the output positive terminal, wherein the upper switch and the lower switch are selectively turned on or turned off, so that the second resonant capacitor, the third resonant capacitor and the output capacitor are pre-charged.

15. The power conversion circuit according to claim 14, wherein on/off states of the upper switch and on/off states of the lower switch are complementary to each other.

\* \* \* \* \*